United States Patent
Kim et al.

(10) Patent No.: US 11,215,864 B2
(45) Date of Patent: Jan. 4, 2022

(54) OPTICAL FILM INCLUDING ASYMMETRICAL PROTRUSION PART AND DISPLAY DEVICE INCLUDING THE SAME

(71) Applicant: Samsung Display Co., Ltd., Yongin-Si (KR)

(72) Inventors: Jonghwan Kim, Busan (KR); Seong-Yong Hwang, Hwaseong-si (KR); Kyung-Min Kim, Hwaseong-si (KR); Sung-Kyu Shim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/989,040

(22) Filed: Aug. 10, 2020

(65) Prior Publication Data
US 2021/0132422 A1 May 6, 2021

(30) Foreign Application Priority Data
Oct. 31, 2019 (KR) .................. 10-2019-0137330

(51) Int. Cl.
*G02F 1/1335* (2006.01)

(52) U.S. Cl.
CPC ...... *G02F 1/1335* (2013.01); *G02F 1/133528* (2013.01); *G02F 1/133562* (2021.01); *G02F 2202/28* (2013.01)

(58) Field of Classification Search
CPC ............. G02F 1/1335; G02F 1/133528; G02F 1/133504; G02F 1/133606; G02F 1/133607; G03F 1/133502
See application file for complete search history.

(56) References Cited

U.S. PATENT DOCUMENTS

| 9,678,379 | B2 | 6/2017 | Hong et al. | |
| 2014/0346469 | A1* | 11/2014 | Shin | G02B 5/0294 257/40 |
| 2018/0045876 | A1* | 2/2018 | Lee | G02F 1/133528 |
| 2019/0163023 | A1 | 5/2019 | Park et al. | |

FOREIGN PATENT DOCUMENTS

| KR | 101678649 B1 | 11/2016 |
| KR | 1020190062647 A | 6/2019 |
| KR | 1020190103980 A | 9/2019 |

* cited by examiner

*Primary Examiner* — Lauren Nguyen
(74) *Attorney, Agent, or Firm* — Cantor Colburn LLP

(57) ABSTRACT

An optical film includes a first pattern layer including a base part and protrusion part groups on the base part and having a first refractive index, and a second pattern layer on the first pattern layer and having a second refractive index greater than the first refractive index. Each of the protrusion part groups includes first and second protrusion parts adjacent to each other. Each of the first and second protrusion parts includes a bottom surface, an upper surface, a first side surface and a second side surface. The first and second protrusion parts are symmetrical with respect to a reference line passing through a center of each of the protrusion part groups and perpendicular to the base part. The first and second protrusion parts are asymmetrical with respect to a center line passing through a center of the upper surface and perpendicular to the bottom surface.

30 Claims, 18 Drawing Sheets

OPTICAL FILM INCLUDING ASYMMETRICAL PROTRUSION PART AND DISPLAY DEVICE INCLUDING THE SAME

This application claims priority to Korean Patent Application No. 10-2019-0137330, filed on Oct. 31, 2019, and all the benefits accruing therefrom under 35 U.S.C. § 119, the content of which in its entirety is herein incorporated by reference.

BACKGROUND

1. Field

Embodiments of the invention herein relate to an optical film and a display device including the same, and more particularly, to an optical film including two pattern layers with different refractive indices and a liquid crystal display device including the same.

2. Description of Related Art

Among various types of display devices used to provide image information, a liquid crystal display is widely used in large display devices and portable display devices due to its advantages such as low power consumption.

The liquid crystal display generates an image by providing light emitted from a backlight unit to a liquid crystal display panel. In addition, in order to improve a display quality deterioration according to a viewing angle, optical films having various functions are added to an outside of the liquid crystal display panel of the liquid crystal display.

SUMMARY

Embodiments of the invention provide an optical film for improving the side viewing angle characteristics of a display device.

Embodiments of the invention also provide a display device with improved side viewing angle characteristics by optimizing the shape of a pattern layer in an optical film.

An embodiment of the invention provides optical film including a first pattern layer including a base part and a plurality of protrusion part groups disposed on the base part and having a first refractive index, and a second pattern layer disposed on the first pattern layer and having a second refractive index greater than the first refractive index, where each of the plurality of protrusion part groups includes a first protrusion part and a second protrusion part disposed adjacent to each other, where each of the first protrusion part and the second protrusion part includes a bottom surface adjacent the base part, an upper surface facing the bottom surface, a first side surface connecting between the bottom surface and the upper surface, and a second side surface connecting between the bottom surface and the upper surface and facing the first side surface, where the first protrusion part and the second protrusion part are symmetrical with respect to a reference line passing through a center of each of the protrusion part groups and perpendicular to the base part, where the first protrusion part and the second protrusion part are asymmetrical with respect to a center line passing through a center of the upper surface and perpendicular to the bottom surface.

In an embodiment, in a cross section perpendicular to the base part, a symmetry line connecting center points, which are disposed on imaginary lines parallel to the upper surface and disposed at a same distance from each of the first side surface and the second side surface, may have an inclination angle equal to or greater than about 80 degrees and equal to or less than about 88 degrees with respect to the base part.

In an embodiment, an included angle between a normal line perpendicular to the bottom surface and the symmetry line may be equal to or greater than about 2 degrees and equal to or less than about 10 degrees.

In an embodiment, the upper surface may be parallel to the bottom surface.

In an embodiment, an inclination angle of the upper surface with respect to the bottom surface may be equal to or greater than about 2 degrees and equal to or less than about 10 degrees.

In an embodiment, in a cross section perpendicular to the base part, each of the first protrusion part and the second protrusion part may have a quadrangle shape in which at least one of a pair of the bottom and upper surfaces and a pair of the first and second side surfaces is not parallel.

In an embodiment, the first protrusion part may include a first bottom surface adjacent the base part, a first upper surface facing the first bottom surface, a first sub side surface connecting between the first bottom surface and the first upper surface and having a first inclination angle with respect to the first bottom surface, and a second sub side surface connecting between the first bottom surface and the first upper surface and having a second inclination angle different from the first inclination angle with respect to the first bottom surface, where the second protrusion part may include a second bottom surface adjacent the base part, a second upper surface facing the second bottom surface, a third sub side surface connecting between the second bottom surface and the second upper surface and having a third inclination angle with respect to the second bottom surface, and a fourth sub side surface connecting between the second bottom surface and the second upper surface and having a fourth inclination angle different from the third inclination angle with respect to the second bottom surface, where the first inclination angle and the fourth inclination angle may be equal to each other, and the second inclination angle and the third inclination angle may be equal to each other, where the first inclination angle to the fourth inclination angle may be acute angles defined by each of the first sub side surface and the fourth sub side surface with the base part.

In an embodiment, the first protrusion part may include a first bottom surface adjacent the base part, a first upper surface facing the first bottom surface, a first sub side surface connecting between the first bottom surface and the first upper surface, and a second sub side surface connecting between the first bottom surface and the first upper surface and facing the first sub side surface, where the second protrusion part may include a second bottom surface adjacent the base part, a second upper surface facing the second bottom surface, a third sub side surface connecting between the second bottom surface and the second upper surface, and a fourth sub side surface connecting between the second bottom surface and the second upper surface and facing the third sub side surface, where in a cross section perpendicular to the base part, a first symmetry line may have an inclination angle equal to or greater than about 80 degrees and equal to or less than about 88 degrees in a clockwise direction with respect to the first bottom surface, the first symmetry line connecting center points disposed on imaginary lines parallel to the first upper surface and disposed at a same distance from each of the first sub side surface and the second sub side surface, where a second symmetry line may have an inclination angle equal to or greater than about 80 degrees and equal to or less than about 88 degrees in a counterclockwise direction with respect to the second bottom surface, the second symmetry line connecting center points disposed on imaginary lines parallel to the second upper surface and disposed at a same distance from each of the third sub side surface and the fourth sub side surface.

In an embodiment, each of the first side surface and the second side surface may be a curved surface convex toward the second pattern layer.

In an embodiment, the radius of curvature of each of the first side surface and the second side surface may be equal to or greater than 40 micrometers (μm) and equal to or less than 120 μm.

In an embodiment, the radius of curvature of the first side surface and the radius of curvature of the second side surface may be equal to each other.

In an embodiment, a difference between the first refractive index and the second refractive index may be equal to or greater than 0.1.

In an embodiment, the plurality of protrusion part groups may extend in a first direction and may be spaced apart from each other in a second direction perpendicular to the first direction.

In an embodiment of the invention, an optical film includes a first pattern layer including a base part and a first protrusion part and a second protrusion part disposed on the base part and having a first refractive index, and a second pattern layer disposed on the first pattern layer and having a second refractive index greater than the first refractive index, where the first protrusion part includes a first bottom surface adjacent the base part, a first upper surface facing the first bottom surface, a first sub side surface connecting between the first bottom surface and the first upper surface, and a second sub side surface connecting between the first bottom surface and the first upper surface and facing the first sub side surface, where the second protrusion part includes a second bottom surface adjacent the base part, a second upper surface facing the second bottom surface, a third sub side surface connecting between the second bottom surface and the second upper surface, and a fourth sub side surface connecting between the second bottom surface and the second upper surface and facing the third sub side surface, where in a cross section perpendicular to the base part, a first symmetry line has an inclination angle equal to or greater than about 80 degrees and equal to or less than about 88 degrees in a clockwise direction with respect to the first bottom surface, the first symmetry line connecting center points disposed on imaginary lines parallel to the first upper surface and disposed at a same distance from each of the first sub side surface and the second sub side surface, where a second symmetry line has an inclination angle equal to or greater than about 80 degrees and equal to or less than about 88 degrees in a counterclockwise direction with respect to the second bottom surface, the second symmetry line connecting center points disposed on imaginary lines parallel to the second upper surface and disposed at a same distance from each of the third sub side surface and the fourth sub side surface.

In an embodiment, the first protrusion part and the second protrusion part may extend in a first direction and may be alternately and repeatedly arranged in a second direction perpendicular to the first direction.

In an embodiment, the first symmetry line of and the symmetry second line may be symmetric with respect to a reference line that passes through a center between the neighboring first and second protrusion parts and is perpendicular to the base part.

In an embodiment, each of a first included angle defined by a first normal line perpendicular to the first bottom surface with the first symmetry line and a second included angle defined by a second normal line perpendicular to the second bottom surface with the second symmetric line may be equal to or greater than about 2 degrees and equal to or less than about 10 degrees.

In an embodiment, each of a first inclination angle of the first upper surface with respect to the first bottom surface and a second inclination angle of the second upper surface with respect to the second bottom surface may be equal to or greater than about 2 degrees and equal to or less than about 10 degrees.

In an embodiment, each of the first sub side surface to the fourth sub side surface may be a curved surface convex toward the second pattern layer.

In an embodiment of the invention, a display device may include a liquid crystal display panel including a plurality of pixel areas, and an optical member disposed on the liquid crystal display panel and including an optical film, where the optical film may include a first pattern layer including a base part and a plurality of protrusion part groups disposed on the base part and having a first refractive index, and a second pattern layer disposed on the first pattern layer and having a second refractive index greater than the first refractive index, where each of the plurality of protrusion part groups may include a first protrusion part and a second protrusion part disposed adjacent to each other, where each of the first protrusion part and the second protrusion part may include a bottom surface adjacent the base part, an upper surface facing the bottom surface, a first side surface connecting between the bottom surface and the upper surface, and a second side surface connecting between the bottom surface and the upper surface and facing the first side surface, where the first protrusion part and the second protrusion part may be symmetrical with respect to a reference line passing through the center of each of the protrusion part groups and perpendicular to the base part, where the first protrusion part and the second protrusion part may be asymmetrical with respect to a center line passing through the center of the upper surface and perpendicular to the bottom surface.

In an embodiment, each of the plurality of pixel areas may overlap both the first protrusion part and the second protrusion part.

In an embodiment, each of the plurality of pixel areas may overlap one or two of the plurality of protrusion part groups.

In an embodiment, the liquid crystal display panel may include a liquid crystal layer, a lower polarizing layer disposed below the liquid crystal layer, and an upper polarizing layer disposed between the liquid crystal layer and the optical film.

In an embodiment, the optical film may be disposed directly on the upper polarizing layer, where the first pattern layer may be an adhesive layer.

In an embodiment, the upper polarizing layer may include a polarizer layer, where the first pattern layer may be directly disposed on the polarizer layer.

In an embodiment, the optical member may further include a base film disposed on the second pattern layer, and an organic layer disposed between the base film and the second pattern layer, where the organic layer may be a primer layer.

In an embodiment, in a cross section perpendicular to the base part, a symmetry line connecting center points, which are disposed on imaginary lines parallel to the upper surface and disposed at a same distance from each of the first side surface and the second side surface, may have an inclination angle equal to or greater than about 80 degrees and equal to or less than about 88 degrees with respect to the base part.

In an embodiment, the upper surface may be parallel to the bottom surface.

In an embodiment, an inclination angle of the upper surface with respect to the bottom surface may be equal to or greater than about 2 degrees and equal to or less than about 10 degrees.

In an embodiment, each of the first side surface and the second side surface may be a curved surface convex toward the second pattern layer.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
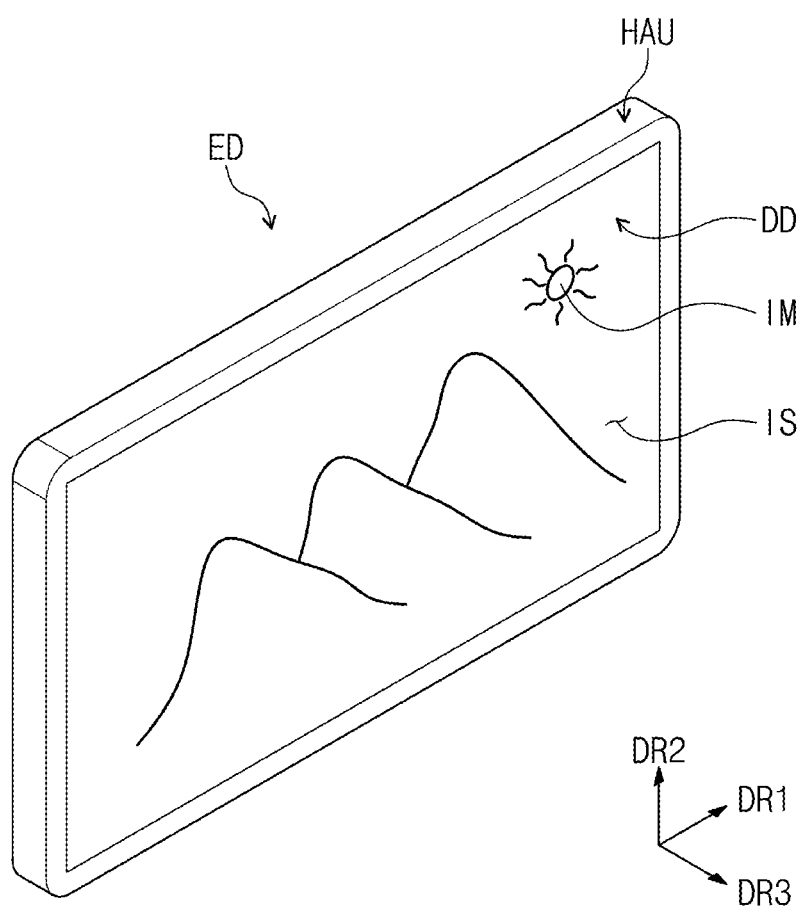
FIG. 1 is a perspective view of an embodiment of an electronic device.

Various modifications are possible in various embodiments of the invention and specific embodiments are illustrated in drawings and related detailed descriptions are listed. However, this does not limit various embodiments of the invention to a specific embodiment and it should be understood that the invention covers all the modifications, equivalents, and/or replacements of this invention provided they come within the scope of the appended claims and their equivalents.

In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

In this specification, a term "directly disposed" in the application may mean that there is no layer, film, region, plate or the like added between the portion of the layer, film, region, plate or the like and another portion. The term "directly disposed" may mean disposing without additional members such as adhesive members between two layers or two members.

Like reference numerals refer to like elements. Additionally, in the drawings, the thicknesses, proportions, and dimensions of components are exaggerated for effective description.

"And/or" includes all of one or more combinations defined by related components.

It will be understood that the terms "first" and "second" are used herein to describe various components but these components should not be limited by these terms. The above terms are used only to distinguish one component from another. A first component may be referred to as a second component and vice versa without departing from the scope of the invention, for example. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing. In the specification, "disposed on" may refer to a case in which one is disposed on the upper portion as well as the lower portion of any one member.

Unless otherwise defined, all terms (including technical and scientific terms) used herein have the same meaning as terms commonly understood by those skilled in the art to which this invention belongs. Also, terms such as terms defined in commonly used dictionaries should be interpreted as having meaning consistent with meaning in the context of the related art, and unless the term is interpreted in an ideal or overly formal sense, they are explicitly defined here.

In various embodiments of the invention, the term "include," "comprise," "including," or "comprising," specifies a property, a region, a fixed number, a step, a process, an element and/or a component but does not exclude other properties, regions, fixed numbers, steps, processes, elements and/or components.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, an electronic device in an embodiment of the invention will be described with reference to the drawings.

Figure 2:
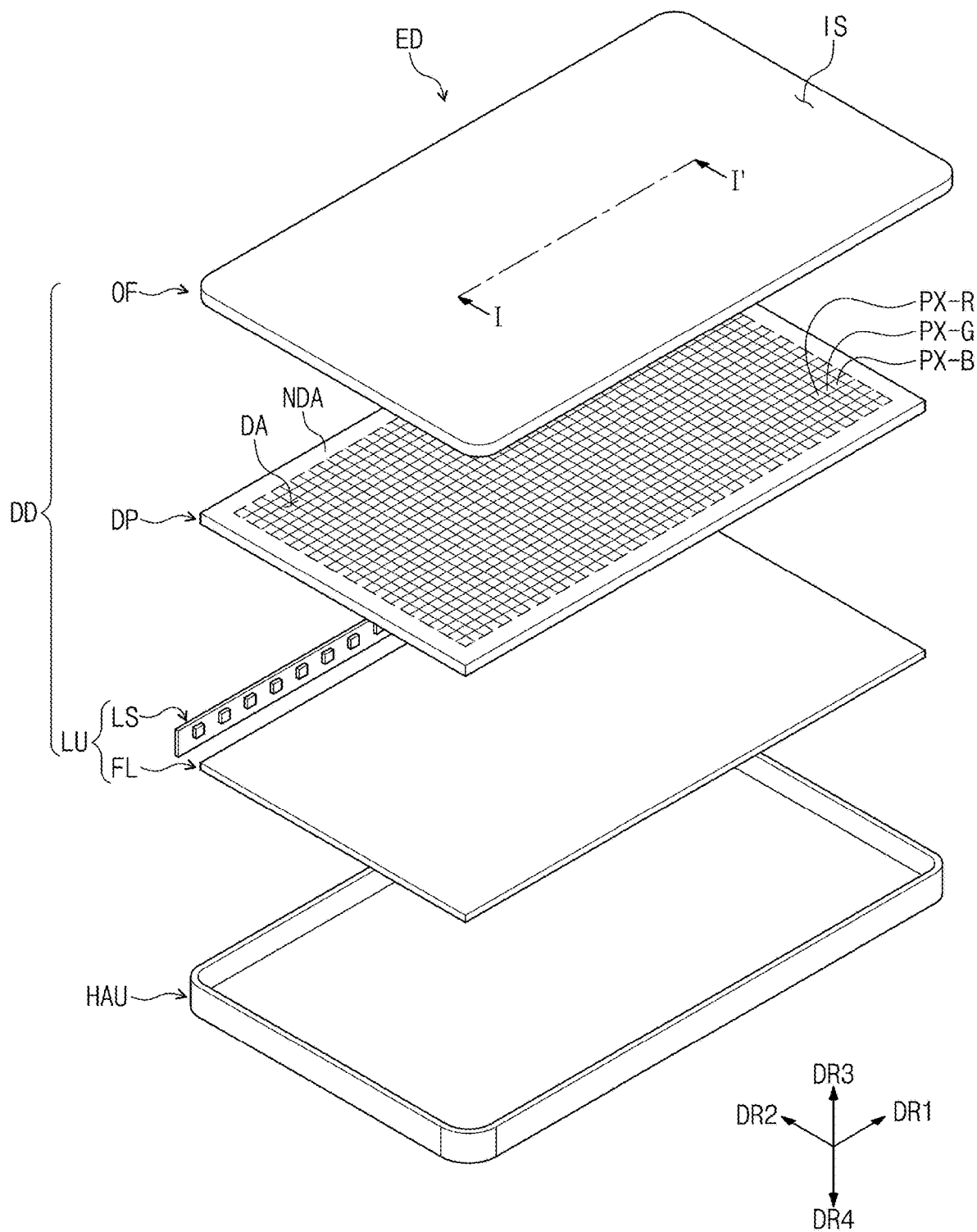
FIG. 2 is an exploded perspective view of the electronic device shown in FIG. 1.
Figure 3:
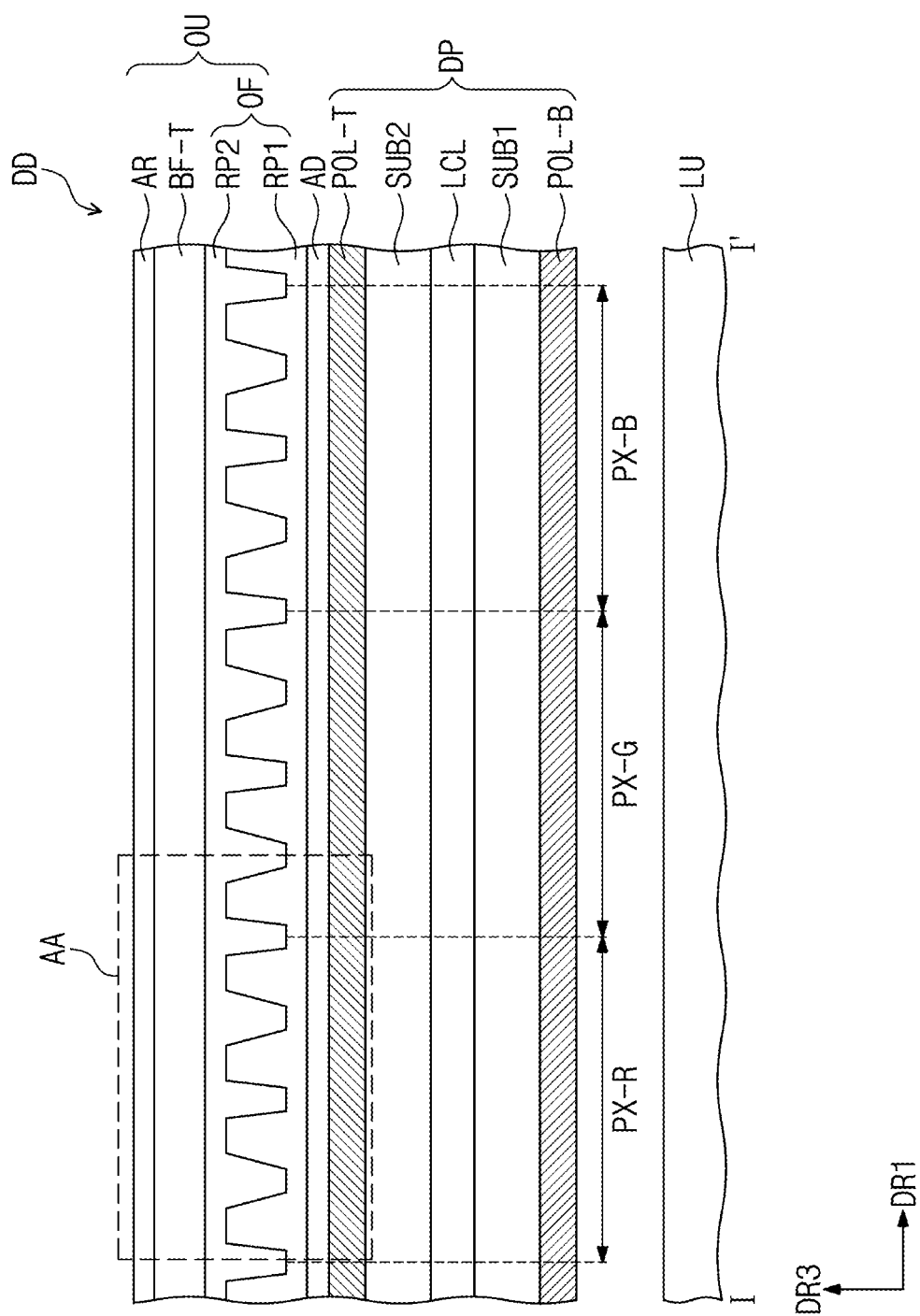
FIG. 3 is a cross-sectional view of an embodiment of a display device.
Figure 4:
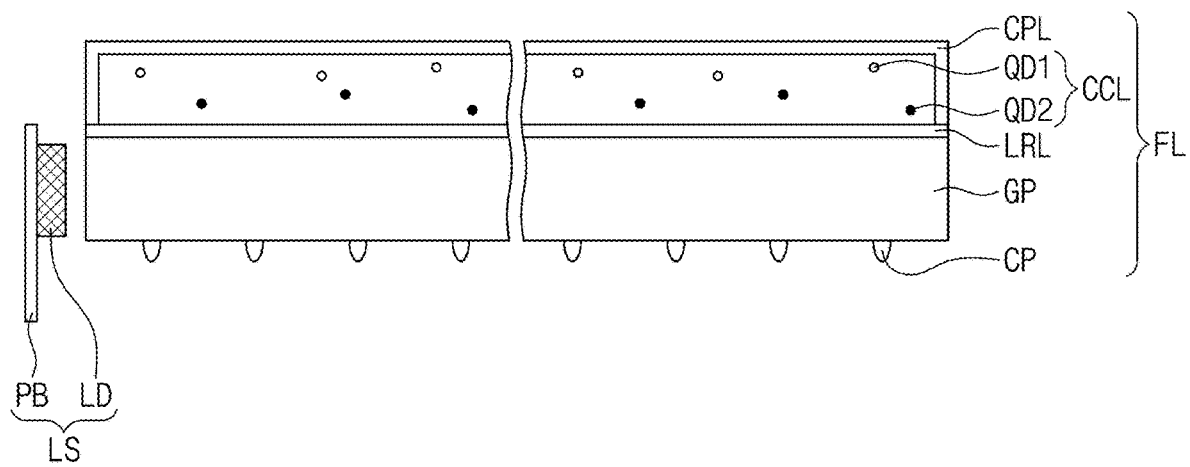
FIG. 4 is a cross-sectional view showing an embodiment of an optical member.
Figure 5:
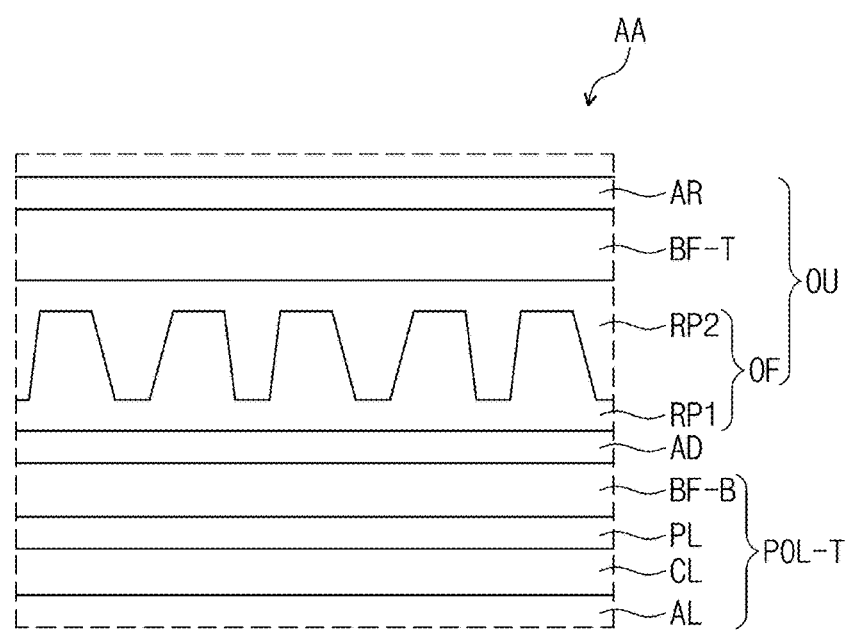
FIG. 5 is a cross-sectional view of an embodiment of a part of a display device.

FIG. 1 is a perspective view illustrating an electronic device. FIG. 2 is an exploded perspective view of the electronic device shown in FIG. 1. FIG. 2 is a cross-sectional view taken along line I-I' of FIG. 1. FIG. 3 is a cross-sectional view of an embodiment of a display device. FIG. 4 is a cross-sectional view of an embodiment of a light source member. FIG. 5 is a cross-sectional view illustrating an embodiment of a part of a display device. FIG. 5 is a cross-sectional view illustrating an example of a portion corresponding to area "AA" of FIG. 3.

Figure 6:
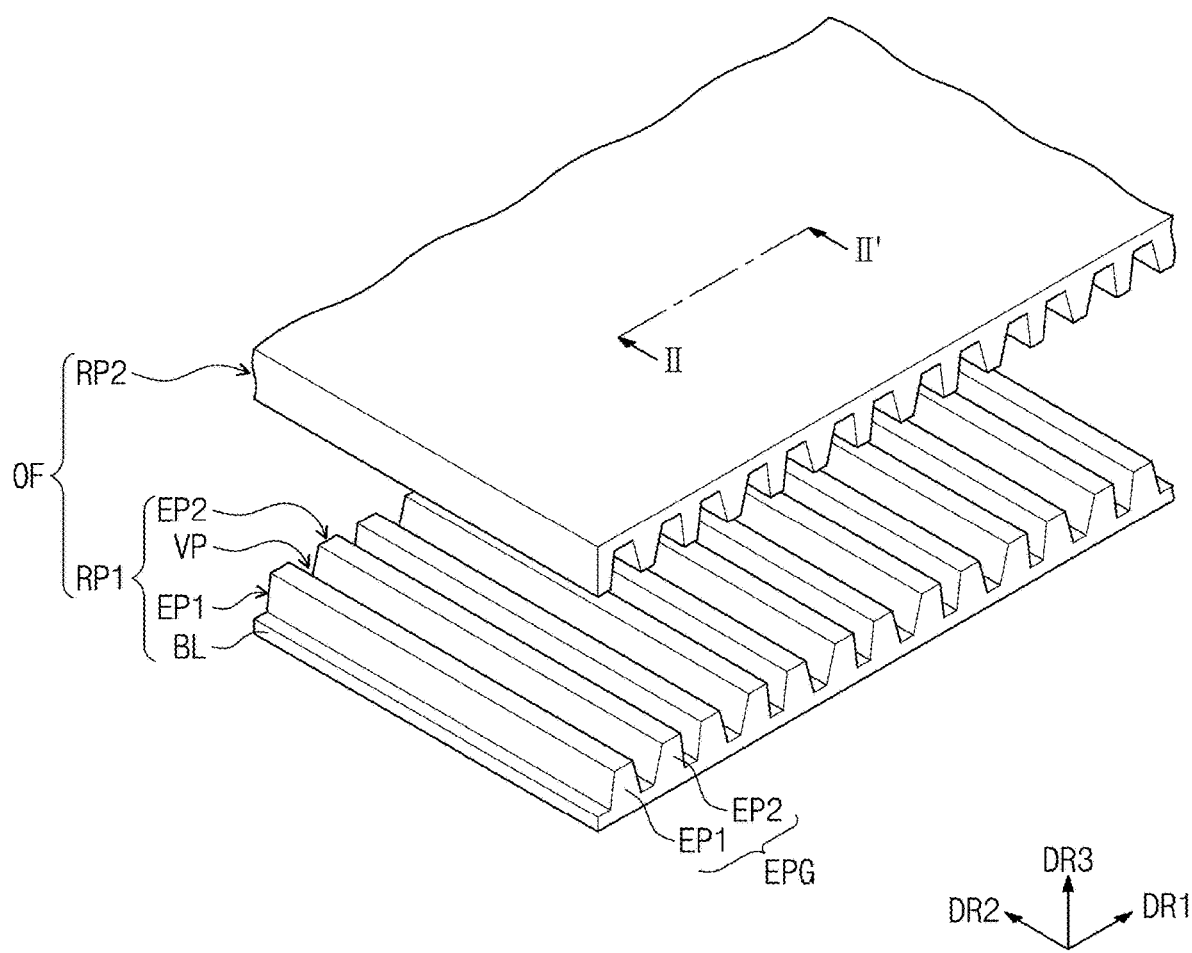
FIG. 6 is an exploded perspective view of an embodiment of an optical film.
Figure 7:
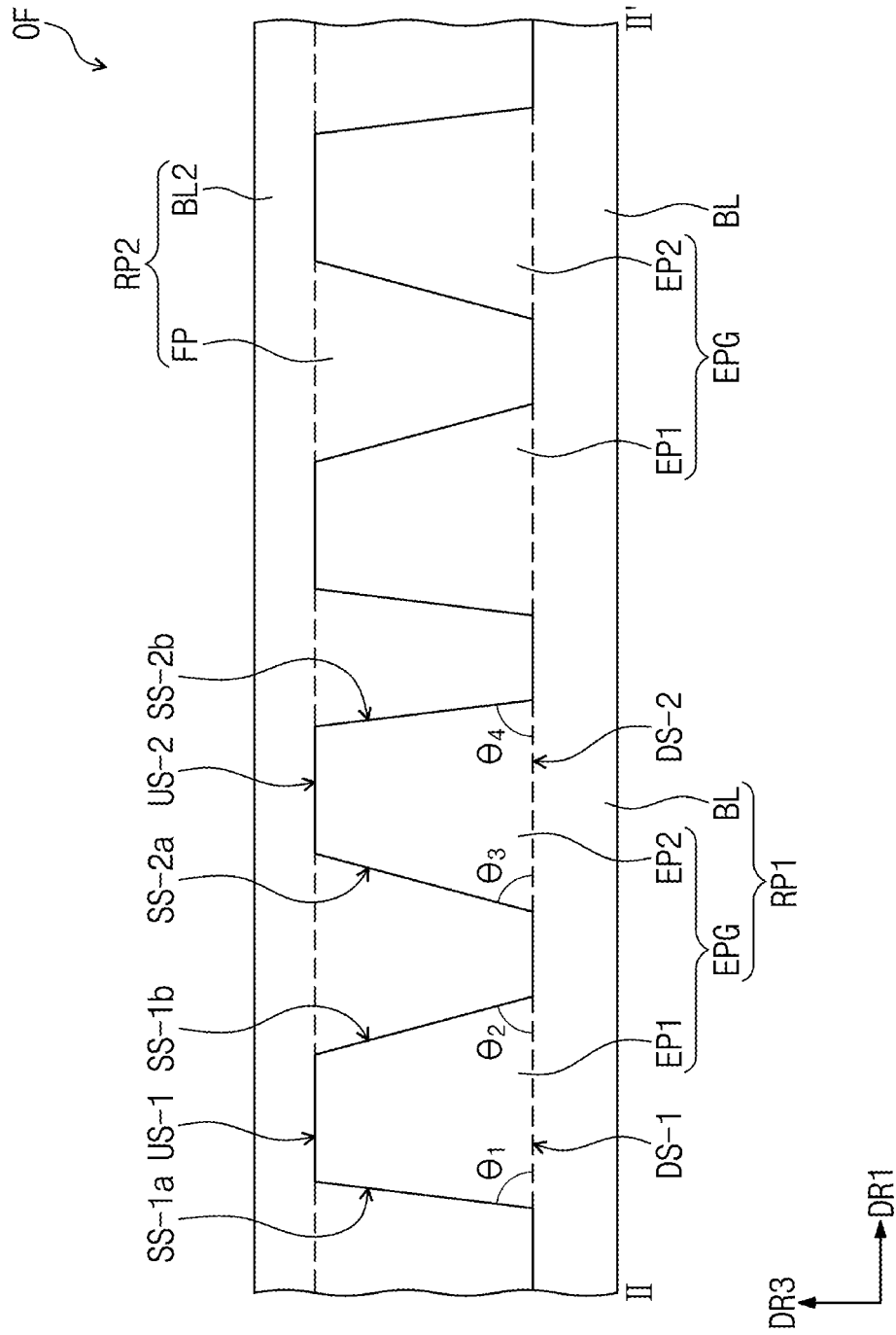
FIG. 7 is a cross-sectional view of an embodiment of a part of an optical film.
Figure 8:
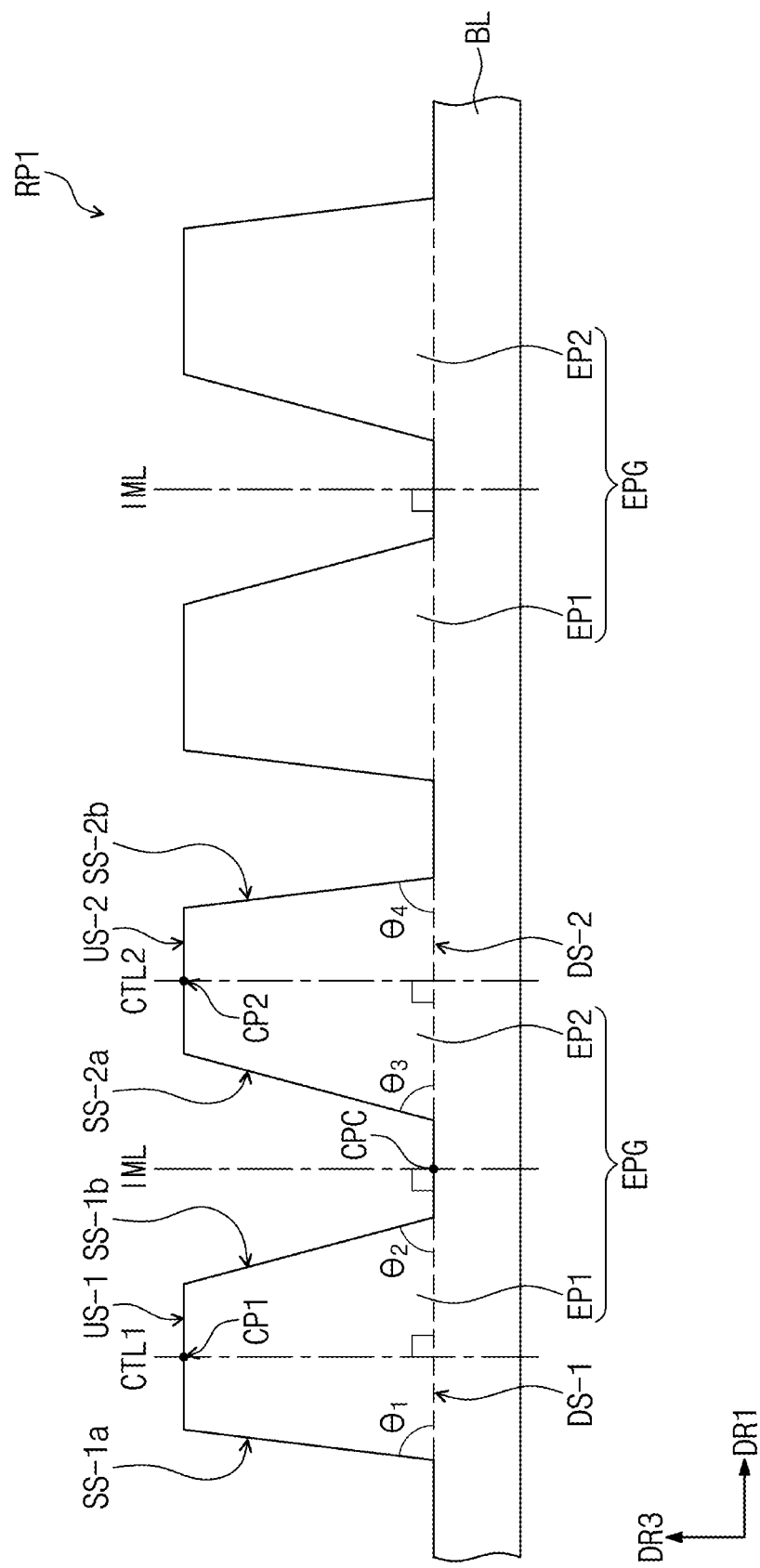
FIG. 8 is a cross-sectional view of an embodiment of a part of a pattern layer of an optical film.
Figure 9:
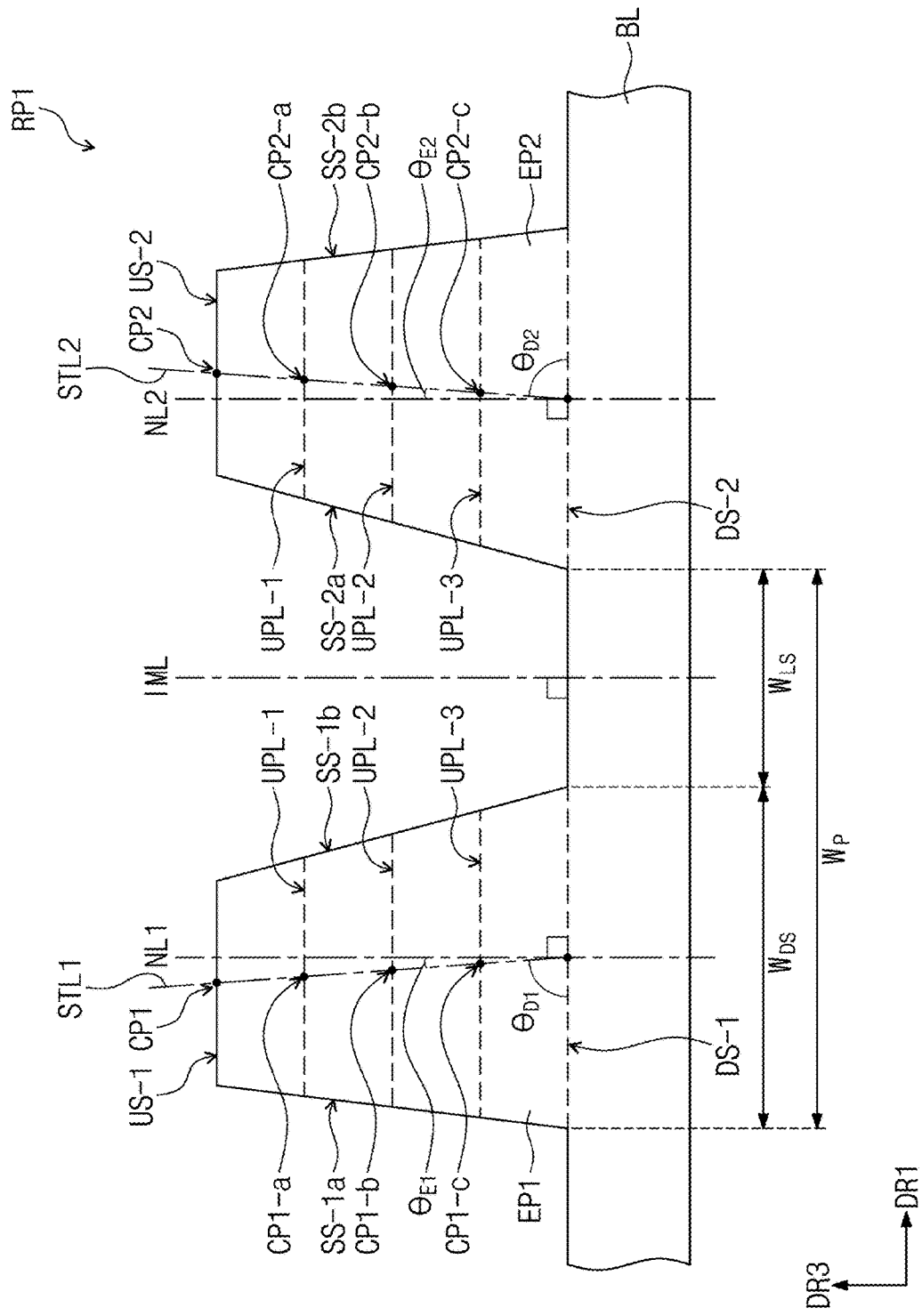
FIG. 9 is a cross-sectional view of an embodiment of a part of a pattern layer of an optical film.

FIGS. 6 to 9 are views of an embodiment of an optical film. FIG. 6 is an exploded perspective view of an embodiment of an optical film. FIGS. 7 and 9 are cross-sectional views showing an embodiment of a part of an optical film.

In an embodiment, the electronic device ED may be a large electronic device such as a television, a monitor, or an external billboard. In another embodiment, the electronic device ED may be a small and medium-sized electronic device such as a personal computer, a notebook computer, a personal digital terminal, a car navigation system, a game machine, a smartphone, a tablet, and a camera. However, these are merely embodiments and it is obvious that they are employed in other electronic devices without departing from the scope of the invention.

The electronic device ED may include a display device DD and a housing HAU. The electronic device ED may display the image IM through the display surface IS. It is shown in FIG. 1 that the display surface IS parallel to a surface defined by a first directional axis DR1 and a second directional axis DR2 intersecting the first directional axis DR1. However, this is merely an example, and in another embodiment, the display surface IS of the electronic device ED may have a curved shape or may include a curved surface.

The third directional axis DR3 indicates the normal direction of the display surface IS, that is, the direction in which the image IM is displayed in the thickness direction of the electronic device ED. In addition, the fourth directional axis DR4 indicates a direction opposite to the third directional axis in the thickness direction of the electronic device ED. The front surface (or an upper surface) and the rear surface (or a lower surface) of each member may be defined by the third directional axis DR3. The directions indicated by the first to fourth directional axes DR1, DR2, DR3, and DR4 may be converted to other directions as relative concepts.

The housing HAU may accommodate the display device DD. The housing HAU may be disposed to cover the display device DD so that the upper surface, which is the display surface IS of the display device DD, is exposed. The housing HAU covers the side and bottom surfaces of the display device DD and may expose the entire upper surface. However, the invention is not limited thereto, and the housing HAU may cover part of the upper surface as well as the side and bottom surfaces of the display device DD.

The display device DD may include a light source member LU, a liquid crystal display panel DP, and an optical member OU. The light source member LU may be disposed below the liquid crystal display panel DP, and the optical member OU may be disposed above the liquid crystal display panel DP.

In an embodiment of the display device DD, the optical member OU includes an optical film OF. The optical film OF may be disposed above the liquid crystal display panel DP. The optical member OU may include an optical film OF and a base film BF-T supporting the optical film OF.

FIG. 4 is a cross-sectional view illustrating an embodiment of a light source member LU. The light source member LU in an embodiment may include the light source LS and the functional layers FL for transmitting the light emitted from the light source LS to the liquid crystal display panel DP. The functional layers FL may include a guide panel GP, a low refractive index layer LRL disposed on the guide panel GP, and a color conversion layer CCL disposed on the low refractive index layer LRL. The light source LS may be disposed on at least one side of the guide panel GP. The light source member LU may further include a barrier layer CPL disposed on the color conversion layer CCL. In addition, a plurality of light emission pattern parts CP may be disposed on a lower surface of the guide panel GP.

In an embodiment of the light source member LU, the light source LS may include a circuit board PB and a plurality of light emitting element packages LD disposed on the circuit board PB. The plurality of light emitting element packages LD may emit light of the same wavelength range. In an alternative embodiment, unlike the above-described embodiment, the light source LS may include a plurality of light emitting element packages LD that emit light in different wavelength ranges. In an embodiment, the light emitting element package LD may emit first light having a center wavelength in a wavelength range equal to or greater than about 440 nanometers (nm) and equal to or less than about 460 nm, for example. In an embodiment, the light emitting element package LD may emit blue light, for example.

In FIG. 2, the light source LS is illustrated to be disposed adjacent to one side surface of the guide panel GP, but the invention is not limited thereto. Unlike the embodiment shown in FIG. 2 or 4, the light source LS may be additionally disposed adjacent to a plurality of side surfaces of the guide panel GP.

In an alternative embodiment, unlike the illustrated embodiments, the light source LS may be disposed below the guide panel GP. That is, the light source LS may be provided in a direct type.

The guide panel GP may be a glass substrate. However, the invention is not limited thereto, and the guide panel GP may be a transparent resin substrate. In an embodiment, the guide panel GP may include an acrylic resin or the like, for example.

The plurality of light emission pattern parts CP disposed on the lower surface of the guide panel GP may transmit light emitted from the light source LS and incident on one side surface of the guide panel GP to an opposite surface of the guide panel GP, or may change the direction of the light so that the light incident in the lower surface direction of the guide panel GP is transmitted in the light exit surface direction, which is the upper surface of the guide panel GP.

The low refractive index layer LRL may be disposed on the guide panel GP. The low refractive index layer LRL may be disposed directly on the guide panel GP. The refractive index of the low refractive index layer LRL may be smaller than the refractive index of the guide panel GP. The low refractive index layer LRL has a refractive index smaller than that of the guide panel GP, so that light incident from the light source LS to one side surface of the guide panel GP may be effectively transmitted to an opposite side surface of the guide panel GP relatively spaced from the light source LS. That is, in an embodiment of the light source member LU, the guide panel GP and the low refractive index layer LRL provided on the guide panel GP may function as a light guide plate.

The light source member LU includes a color conversion layer CCL disposed on the low refractive index layer LRL. The color conversion layer CCL may change the color of the light provided from the light source LS and transmit the color to the liquid crystal display panel DP. The color conversion layer CCL may change the color of the light provided from the light source LS and transmit the color to the liquid crystal display panel DP. In an embodiment, the color conversion layer CCL may include a plurality of quantum dots QD1 and QD2 for converting incident light into colors of different wavelength ranges. In an embodiment, when the light provided by the light source LS is the first light of the blue light wavelength range, the color conversion layer CCL may include a first quantum dot QD1 that is excited by blue light and emits green light and a second quantum dot QD2 that is excited by blue light and emits red light, for example.

The barrier layer CPL may be disposed on the color conversion layer CCL. The barrier layer CPL may serve to prevent penetration of moisture and/or oxygen (hereinafter, also referred to as "moisture/oxygen") into the color conversion layer CCL. The barrier layer CPL may cover the color conversion layer CCL.

The liquid crystal display panel DP is disposed on the light source member LU. The liquid crystal display panel DP may include a first substrate SUB1 and a second substrate SUB2 facing each other and a liquid crystal layer LCL disposed between the first substrate SUB1 and the second substrate SUB2.

The liquid crystal display panel DP may be divided into a display area DA and an edge area NDA surrounding the display area DA. The display area DA is an area where an image is displayed in the plan view, and the edge area NDA is an area which is adjacent to the display area in the plan view and where the image is not displayed. The liquid crystal display panel DP may include a plurality of pixel areas PX-R, PX-G, and PX-B disposed in the display area DA.

In the liquid crystal display panel DP, a signal line and a pixel circuit are disposed on any one of the first substrate SUB1 and the second substrate SUB2 (hereinafter, also referred to as an array substrate). In an embodiment, the array substrate may be connected to the main circuit board through a chip on film ("COF") or the like, for example. A central control circuit for driving the liquid crystal display panel DP may be disposed on the main circuit board. In an embodiment, the central control circuit may be a microprocessor, for example. The chip of the COF may be a data driving circuit. The gate driving circuit may be disposed (e.g., mounted) on the array substrate or may be integrated on the array substrate in the form of low temperature poly-silicone ("LTPS").

The plurality of pixel areas PX-R, PX-G, and PX-B is defined by, for example, a plurality of gate lines (not shown) and a plurality of data lines (not shown) provided on the array substrate.

The plurality of pixel areas PX-R, PX-G, and PX-B may be arranged in a matrix form in a plan view defined by the first directional axis DR1 and the second directional axis DR2. However, the invention is not limited thereto, and the plurality of pixel areas PX-R, PX-G, and PX-B may be arranged in various other forms. In an embodiment, the pixel areas that implement different colors among the plurality of pixel areas PX-R, PX-G, and PX-B may be arranged in the direction of the first directional axis DR1. In addition, the pixel areas that implement the same color may be arranged in the direction of the second directional axis DR2.

In an embodiment, the plurality of pixel areas PX-R, PX-G, and PX-B may include a red pixel area PX-R, a green pixel area PX-G, and a blue pixel area PX-B, which are adjacently arranged in the direction of the first directional axis DR1, for example. Moreover, although not shown in the drawings, the liquid crystal display panel DP may further include a white pixel area (not shown).

In an embodiment of the liquid crystal display panel DP, the red pixel area PX-R, the green pixel area PX-G, and the blue pixel area PX-B may be sequentially arranged in the direction of the first directional axis DR1. That is, the red pixel area PX-R, the green pixel area PX-G, and the blue pixel area PX-B, which implement different colors, may be sequentially arranged in the direction of the first directional axis DR1. Each of the plurality of red pixel areas PX-R, the plurality of green pixel areas PX-G, and the plurality of blue pixel areas PX-B may be arranged in the direction of the second directional axis DR2 that intersects the first directional axis DR1. However, the invention is not limited thereto, and an arrangement position of each pixel area may be changed according to color characteristics desired by the display device DD.

In an embodiment, each of the plurality of pixel areas PX-R, PX-G, and PX-B is a sub pixel area, and such a group of pixel areas PX-R, PX-G, and PX-B may be divided into one main pixel area. In an embodiment, the main pixel area may be controlled and driven as one unit during the operation of the display device DD, for example.

In an embodiment of the display device DD, the plurality of protrusion parts EP1 and EP2 may be correspondingly disposed in one pixel area of the liquid crystal display panel DP. The protrusion part group EPG may be disposed to overlap each of the pixel areas PX-R, PX-G, and PX-B. In an embodiment, one or two protrusion part groups EPG may be disposed to overlap each of the pixel areas PX-R, PX-G, and PX-B, for example.

The liquid crystal layer LCL includes a liquid crystal. In an embodiment, the liquid crystal layer LCL of the liquid crystal display panel DP may include a vertically aligned liquid crystal. The liquid crystal included in the liquid crystal layer LCL may be vertically aligned with respect to the first substrate SUB1 or the second substrate SUB2. In an embodiment, the liquid crystal may be aligned to have an inclination angle equal to or greater than about 88 degrees)(° and equal to or less than about 90° with respect to the upper surface of the first substrate SUB1 or the lower surface of the second substrate SUB2, for example. In the an embodiment of display device DD, the liquid crystal display panel DP may be a liquid crystal display panel in a vertical alignment mode.

However, the invention is not limited thereto. In an embodiment of the display device DD, the liquid crystal display panel DP may be used for various types of display panels such as a twisted nematic ("TN") mode, a horizontal alignment mode, a super vertical alignment ("SVA") mode, a super patterned vertical alignment ("S-PVA") mode, an optically compensated bend ("OCB") mode, or an electrically controlled birefringence ("ECB") mode. In addition, the liquid crystal display panel DP may have a driving method of a display panel different from that illustrated and an alignment direction method of liquid crystal molecules.

The liquid crystal display panel DP may include polarizing layers POL-T and POL-B. In FIG. 3, a lower polarizing layer POL-B disposed under the first substrate SUB1, which is a lower substrate of the liquid crystal display panel DP, and an upper polarizing layer POL-T disposed on the second substrate SUB2, which is the upper substrate of the liquid crystal display panel DP, are illustrated.

That is, the lower polarizing layer POL-B may be disposed between the light source member LU and the liquid crystal layer LCL, and the upper polarizing layer POL-T may be disposed between the liquid crystal layer LCL and the optical film OF.

The polarizing layers POL-T and POL-B may include a polarizer PL. The polarizer PL may be a linear polarizer for linearly polarizing the provided light in one direction. The polarizer PL may be a film type polarizer including the stretched polymer film. In an embodiment, the stretched polymer film may be a stretched polyvinylalcohol based film. In addition, the polarizer PL may be a coated polarizing layer, for example.

Also, unlike the illustrated embodiment shown in the drawing, the polarizing layers POL-T and POL-B may be in-cell polarizing layers independently disposed between the first substrate SUB1 and the liquid crystal layer LCL, or between the second substrate SUB2 and the liquid crystal layer LCL.

In an embodiment, the lower polarizing layer POL-B may be a coated polarizing layer or a polarizing layer provided by deposition, for example. The lower polarizing layer POL-B may be provided by coating a substance including a dichroic dye and a liquid crystal compound. In an alternative embodiment, the lower polarizing layer POL-B may be a wire grid type polarizing layer. The lower polarizing layer POL-B may be disposed under the liquid crystal display panel DP in a film type. In this case, an adhesive layer may be further disposed between the lower polarizing layer POL-B and the liquid crystal display panel DP.

In addition, the upper polarizing layer POL-T may be a coated polarizing layer or a polarizing layer provided by deposition.

The transmission axis of the polarizer PL included in the upper polarizing layer POL-T disposed on the second substrate SUB2 and the transmission axis of the polarizer layer (not shown) included in the lower polarizing layer POL-B are perpendicular to each other. However, the invention is not limited thereto.

The polarizing layers POL-T and POL-B may further include an optical layer CL such as a phase delay layer and an optical compensation layer. The optical layer CL, such as a phase delay layer and an optical compensation layer, may be disposed on an upper surface or a lower surface of the polarizer PL. In an embodiment, an adhesive layer may be further included between the polarizer PL and the optical layer CL, for example. In addition, the upper polarizing layer POL-T may further include an adhesive member AL. The adhesive member AL may be an adhesive layer that attaches the upper polarizing layer POL-T to the second substrate SUB2. The adhesive member AL may be an optically transparent adhesive layer.

The upper polarizing layer POL-T may include a base layer BF-B. The base layer BF-B may be a member that provides a base surface on which the polarizer PL and the optical layer CL are disposed. The base layer BF-B may include a polymer material. In an embodiment, the base layer BF-B may include polyimide, polyacrylate, polymethylmethacrylate ("PMMA"), polycarbonate ("PC"), polyethylenenaphthalate ("PEN"), polyvinylidene chloride, polyvinylidene difluoride ("PVDF"), polystyrene, ethylene vinylalcohol copolymer, or a combination thereof, for example. However, the material of the base layer BF-B used in the embodiment is not limited to the polymer material presented, and any material having an optical transparency capable of providing an image IM provided from the liquid crystal display panel DP to a user may be used without limitation.

In another embodiment, the base layer BF-B of the upper polarizing layer POL-T may be omitted. In an embodiment, the base layer BF-B disposed between the optical film OF and the polarizer PL may be omitted, for example.

In an embodiment of the display device DD, the optical member OU may be disposed on the liquid crystal display panel DP. The optical member OU may include an optical film OF. In addition, the optical member OU may further include a base film BF-T provided on the optical film OF.

The optical film OF may be disposed on the liquid crystal display panel DP. In an embodiment, the optical film OF may be disposed above the upper polarizing layer POL-T. In addition, an adhesive layer AD may be disposed between the upper polarizing layer POL-T and the optical film OF. In another embodiment, the adhesive layer AD may be omitted, and the optical film OF may be directly disposed on the upper polarizing layer POL-T.

In another embodiment, the optical film OF may be directly disposed on the polarizer PL of the upper polarizing layer POL-T. In this case, the base layer BF-B of the upper polarizing layer POL-T may be omitted.

The optical member OU may include a base film BF-T, and the base film BF-T may be disposed above the optical film OF. The base film BF-T may function as a support for supporting the optical film OF or a protective layer for protecting the optical film OF. In an embodiment, a polyethylene terephthalate ("PET") film or the like may be used as the base film BF-T, for example.

The optical member OU may further include a protective layer AR disposed on the base film BF-T. In an embodiment, the protective layer AR may be a reflective ring layer, a hard coating layer, an anti-fingerprint coating layer, an anti-glare layer, or the like, for example, but the invention is not limited thereto.

In an embodiment, the optical film OF may include a first pattern layer RP1 and a second pattern layer RP2. In an embodiment, the first pattern layer RP1 may be disposed adjacent to the liquid crystal display panel DP, and the second pattern layer RP2 may be disposed above the first pattern layer RP1.

Referring to FIGS. 6 to 9, the first pattern layer RP1 may include a plurality of protrusion parts EP1 and EP2, and a concave part VP may be defined between adjacent protrusion parts EP1 and EP2. The second pattern layer RP2 may cover the protrusion parts EP1 and EP2 of the first pattern layer RP1 and fill the concave parts VP.

In an embodiment, the second pattern layer RP2 may be disposed on the first pattern layer RP1, and the second pattern layer RP2 may fill the concave parts VP between the plurality of protrusion parts EP1 and EP2. The second pattern layer RP2 may include an upper base part BL2 and a filling part FP disposed below the upper base part BL2. The plurality of filling parts FP may be arranged and disposed under the upper base part BL2. The second pattern layer RP2 including the upper base part BL2 and the filling part FP may cover the protrusion parts EP1 and EP2 of the first pattern layer RP1.

The refractive indexes of the first pattern layer RP1 and the second pattern layer RP2 may be different from each other. In an embodiment, the absolute value of the difference in refractive index between the first pattern layer RP1 and the second pattern layer RP2 may be equal to or greater than about 0.1, for example. In an embodiment, the absolute value of the difference in refractive index between the first pattern layer RP1 and the second pattern layer RP2 may be equal to or greater than about 0.12, for example.

In an embodiment of the optical film OF, the refractive index of the second pattern layer RP2 may be greater than that of the first pattern layer RP1. In an embodiment, the refractive index of the first pattern layer RP1 may be equal to or greater than about 1.42 and equal to or less than about 1.50, and the refractive index of the second pattern layer RP2 may be equal to or greater than about 1.55 and equal to or less than about 1.70, for example. However, the invention is not limited thereto, and the refractive index value of each pattern layer may be variously adjusted within a range in which a difference in refractive index between the first pattern layer RP1 and the second pattern layer RP2 is equal to or greater than about 0.1. In an embodiment, the refractive index of the first pattern layer RP1 may be greater than that of the second pattern layer RP2, for example. In this case, the refractive index of the first pattern layer RP1 may be equal to or greater than about 1.55 and equal to or less than about 1.70, and the refractive index of the second pattern layer RP2 may be equal to or greater than about 1.42 and equal to or less than about 1.50, for example.

In an embodiment of the optical film OF, the first pattern layer RP1 may include a base part BL and a plurality of protrusion part groups EPG. The plurality of protrusion part groups EPG may be arranged on the base part BL.

Each of the plurality of protrusion part groups EPG may be provided to extend in one direction. Referring to FIG. 6, each of the plurality of protrusion part groups EPG may extend in the direction of the second directional axis DR2. In addition, the adjacent protrusion part groups EPG may be spaced apart from each other in the direction of the first directional axis DR1 perpendicular to the second directional axis DR2.

In addition, each of the plurality of protrusion part groups EPG may include a first protrusion part EP1 and a second protrusion part EP2 disposed on the base part BL. In an embodiment of the optical film OF, each of the first protrusion part EP1 and the second protrusion part EP2 may extend in the direction of the second directional axis DR2, which is one direction. In addition, the first protrusion part EP1 and the second protrusion part EP2 may be spaced apart from each other in the direction of the first directional axis DR1 perpendicular to the second directional axis DR2. That is, the first protrusion part EP1 and the second protrusion part EP2 may be arranged to represent a stripe pattern in a plan view defined by the first directional axis DR1 and the second directional axis DR2. In an embodiment of the optical film OF, each of the first protrusion part EP1 and the second protrusion part EP2 may extend in the direction of the second directional axis DR2, which is a first direction, and may be arranged alternately and repeatedly in the direction of the first directional axis DR1, which is a second direction perpendicular to the first direction.

In an embodiment of the optical film OF, a pitch $W_P$ in which the protrusion parts EP1 and EP2 are arranged may be equal to or greater than about 10 micrometers (μm) and equal to or less than about 100 μm, for example. In an embodiment, the pitch $W_P$ in which the protrusion parts EP1 and EP2 are arranged may be equal to or greater than about 10 μm and equal to or less than about 50 μm, for example. Specifically, the pitch $W_P$ in which the protrusion parts EP1 and EP2 are arranged may be equal to or greater than about 20 μm and equal to or less than about 40 μm, for example. The width $W_{DS}$ of the bottom surfaces DS-1 and DS-2 may be equal to or greater than about 8 μm and equal to or less than about 21 μm, for example. In detail, the separation pitch $W_P$ between adjacent protrusion parts EP1 and EP2 may be about 27.5 μm, and the width $W_{DS}$ of the bottom surfaces DS-1 and DS-2 may be about 16 μm, for example.

The pitch $W_P$ in which the protrusion parts EP1 and EP2 are arranged is obtained by adding the width $W_{DS}$ of the bottom surfaces DS-1 and DS-2 and the minimum separation pitch $W_{LS}$ between adjacent protrusion parts EP1 and EP2. Both the width $W_{DS}$ and the minimum separation width $W_{LS}$ are distances in the direction of the first directional axis DR1 perpendicular to the direction of the second directional axis DR2 which is the extension direction of the protrusion parts EP1 and EP2. Referring to FIGS. 6 to 9, the pitch $W_P$, the width $W_{DS}$, and the minimum separation width $W_{LS}$ are all distances in a direction of the first directional axis DR1.

In the specification, the width corresponds to the minimum width in the direction parallel to the first directional axis DR1 in the cross section. In the specification, the width is measured in a cross section perpendicular to the base part BL, that is, a width on a plane parallel to a plane defined by the first directional axis DR1 and the third directional axis DR3, and in the direction perpendicular to the extension direction of the protrusion parts EP1 and EP2. In addition, the inclination angle in the specification corresponds to an acute angle defined with reference to a reference plane or line.

Referring to FIGS. 1 to 6, the extension direction of the protrusion parts EP1 and EP2 of the optical film OF may be parallel to the up and down direction in a view facing the display surface IS of the electronic device ED. That is, in an embodiment of the display device DD shown in FIG. 1 and FIG. 2, an extension direction of the protrusion parts EP1 and EP2 of the optical film OF may be in a direction parallel to the second directional axis DR2 that is parallel to the short side of the display device DD.

In FIG. 1, the left and right directions of the display surface IS of the electronic device ED are shown as the long side directions, and the up and down directions are shown as the short side directions. However, the invention is not limited thereto. Unlike the illustrated embodiment shown in the drawings, in a view of the user facing the electronic device ED, the left and right directions of the display surface IS of the electronic device ED may be the short side directions, and the up and down directions may be the long side directions. In this case, an extension direction of the protrusion parts EP1 and EP2 of the optical film OF may be in a direction parallel to the long side of the display device DD.

In addition, the invention is not limited thereto. Depending on the usage environment of the electronic device ED, an extension direction of the protrusion parts EP1 and EP2 may be parallel to left and right directions in a view facing the display surface IS of the electronic device ED.

The first protrusion part EP1 and the second protrusion part EP2 may respectively include bottom surfaces DS-1 and DS-2 adjacent to the base part BL, upper surfaces US-1 and US-2 facing the bottom surfaces DS-1 and DS-2, first side surfaces SS-1a and SS-2a connecting between the bottom surfaces DS-1 and DS-2 and the upper surfaces US-1 and US-2, and second side surfaces SS-1b and SS-2b connecting between the bottom surfaces DS-1 and DS-2 and the upper surfaces US-1 and US-2 and facing the first side surfaces SS-1a and SS-2a.

That is, the first protrusion part EP1 may include a first bottom surface DS-1, a first upper surface US-1 facing the first bottom surface DS-1, a first sub side surface SS-1a disposed between the first bottom surface DS-1 and the first upper surface US-1, and a second sub side surface SS-1b facing the first sub side surface SS-1a. The second protrusion part EP2 may include a second bottom surface DS-2, a second upper surface US-2 facing the second bottom surface DS-2, a third sub side surface SS-2a disposed between the second bottom surface DS-2 and the second upper surface US-2, and a fourth sub side surface SS-2b facing the third sub side surface SS-2a.

In an embodiment, the second sub side surface SS-1b and the third sub side surface SS-2a are adjacent surfaces in the first protrusion part EP1 and the second protrusion part EP2 which are adjacent to each other, and the first sub side surface SS-1a and the fourth sub side surface SS-2b may correspond to the most distant surfaces. In this specification, the minimum separation pitch between the second sub side surface SS-1b and the third sub side surface SS-2a may be the minimum separation pitch $W_{LS}$ between the protrusion parts EP1 and EP2.

One protrusion part group EPG includes a first protrusion part EP1 and a second protrusion part EP2. The first protrusion part EP1 and the second protrusion part EP2 included in one protrusion part group EPG may be symmetrical to each other based on the reference line IML, which is an imaginary line passing through the center CPC of the protrusion part group EPG. Also, in the cross section perpendicular to the base part BL, each of the first protrusion part EP1 and the second protrusion part EP2 may have an asymmetric shape.

The first protrusion part EP1 may have an asymmetric shape with reference to the first center line CTL1 passing through the center CP1 of the first upper surface US-1 and perpendicular to the first bottom surface DS-1. In addition, the second protrusion part EP2 may have an asymmetric shape with reference to the second center line CTL2 passing through the center CP2 of the second upper surface US-2 and perpendicular to the second bottom surface DS-2.

In an embodiment of the optical film OF, the first side surfaces SS-1a and SS-2a and the second side surfaces SS-1b and SS-2b may be inclined surfaces or curved surfaces, respectively. In an embodiment, when the first side surfaces SS-1a and SS-2a and the second side surfaces SS-1b and SS-2b are inclined surfaces, the inclination angles $\theta_1$ and $\theta_3$ between the first side surfaces SS-1a and SS-2a and the bottom surfaces DS-1 and DS-2 and the inclination angles $\theta_2$ and $\theta_4$ between the second side surfaces SS-1b and SS-2b and the bottom surfaces DS-1 and DS-2 may be different from each other, for example.

In addition, the first side surfaces SS-1a and SS-2a and the second side surfaces SS-1b and SS-2b may be curved surfaces that are convex toward the second pattern layer RP2. The first side surfaces SS-1a and SS-2a and the second side surfaces SS-1b and SS-2b are curved surfaces that are asymmetric with respect to the center lines CTL1 and CTL2. The curved surfaces may have the same radius of curvature.

In an embodiment of the optical film OF shown in FIGS. 7 to 9, the first inclination angle $\theta_1$ between the first sub side surface SS-1a and the first bottom surface DS-1 of the first protrusion part EP1 and the second inclination angle $\theta_2$ between the second sub side surface SS-1b and the first bottom surface DS-1 may be different from each other. In an embodiment, the first inclination angle $\theta_1$ may be greater than the second inclination angle $\theta_2$, for example. In addition, the third inclination angle $\theta_3$ between the third sub side surface SS-2a and the second bottom surface DS-2 of the second protrusion part EP2 and the fourth inclination angle $\theta_4$ between the fourth sub side surface SS-2b and the second bottom surface DS-2 may be different from each other. In an embodiment, the fourth inclination angle $\theta_4$ may be greater than the third inclination angle $\theta_3$, for example.

In an embodiment of the optical film OF, the first inclination angle $\theta_1$ and the fourth inclination angle $\theta_4$ may be the same, and the second inclination angle $\theta_2$ and the third inclination angle $\theta_3$ may be the same. In an embodiment, each of the first inclination angle $\theta_1$ and the fourth inclination angle $\theta_4$ may be equal to or greater than about 85 degrees and equal to or less than about 90 degrees, for example.

In the cross section perpendicular to the base part BL, the symmetry lines STL1 and STL2 that connect the center points CP1, CP1-a, CP1-b, CP-1c, CP2, CP2-a, CP2-b and CP2-c which are at the same distance from each of the first side surfaces SS-1a and SS-2a and the second side surfaces SS-2a and SS-2b of the protrusion parts EP1 and EP2 included in the first pattern layer RP1 may have inclination angles $\theta_{D1}$ and $\theta_{D2}$ equal to or greater than about 80 degrees and equal to or less than about 88 degrees with respect to the base part BL. In addition, the included angles $\theta_{E1}$ and $\theta_{E2}$ between the normal lines NL1 and NL2 perpendicular to the bottom surfaces DS-1 and DS-2 and the symmetry lines STL1 and STL2 may be equal to or greater than about 2 degrees and equal to or less than about 10 degrees. In an embodiment, the included angles $\theta_{E1}$ and $\theta_{E2}$ between the normal lines NL1 and NL2 perpendicular to the bottom surfaces DS-1 and DS-2 and the symmetry lines STL1 and STL2 may be equal to or greater than about 2 degrees and equal to or less than about 5 degrees, for example.

When the included angles $\theta_{E1}$ and $\theta_{E2}$ between the normal lines NL1 and NL2 perpendicular to the bottom surfaces DS-1 and DS-2 and the symmetry lines STL1 and STL2 are less than about 2 degrees, the side surface viewing angle optical characteristic improvement effect of the optical film OF may not be sufficient. When the included angles $\theta_{E1}$ and $\theta_{E2}$ between the normal lines NL1 and NL2 perpendicular to the bottom surfaces DS-1 and DS-2 and the symmetry lines STL1 and STL2 are greater than about 10 degrees, processability of manufacturing the protrusion parts EP1 and EP2 and the optical film OF including the same may be reduced.

The first symmetry line STL1 is an imaginary line connecting the center points CP1, CP1-a, CP1-b, and CP1-c, which are at the same distance from each of the first sub side surface SS-1a and the second sub side surface SS-1b of the first protrusion part EP1, and are on the imaginary lines UPL-1, UPL-2, and UPL-3 parallel to the first upper surface US-1 in a cross section perpendicular to the base part BL. The first symmetry line STL1 may have an inclination angle $\theta_{D1}$ equal to or greater than about 80 degrees and equal to or less than about 88 degrees with reference to the base part BL. The inclination angle $\theta_{D1}$ is an angle in a clockwise direction with respect to the first bottom surface DS-1. In addition, the included angle $\theta_{E1}$ between the first normal line NL1 perpendicular to the first bottom surface DS-1 and the first symmetry line STL1 may be equal to or greater than about 2 degrees and equal to or less than about 10 degrees.

The second symmetry line STL2 is an imaginary line connecting the center points CP2, CP2-a, CP2-b, and CP2-c, which are at the same distance from each of the third sub side surface SS-2a and the fourth sub side surface SS-2b of the second protrusion part EP2, and are on the imaginary lines UPL-1, UPL-2, and UPL-3 parallel to the second upper surface US-2 in a cross section perpendicular to the base part BL. The second symmetry line STL2 may have an inclination angle $\theta_{D2}$ equal to or greater than about 80 degrees and equal to or less than about 88 degrees with reference to the base part BL. The inclination angle $\theta_{D2}$ is an angle in the counterclockwise direction with respect to the second bottom surface DS-2. In addition, the included angle $\theta_{E2}$ between the second normal line NL2 perpendicular to the second bottom surface DS-2 and the second symmetry line STL2 may be equal to or greater than about 2 degrees and equal to or less than about 10 degrees.

The first pattern layer RP1 included in the optical film OF in an embodiment has an asymmetric shape and includes a first protrusion part EP1 and a second protrusion part EP2 provided in a form symmetrical with respect to the reference line IML so that it may be used as an optical member to improve side surface viewing angle characteristics of the display device DD. In an embodiment of the display device DD, each of the first pattern layers RP1 of the optical film OF overlapping one pixel area has an asymmetric shape, and includes a first protrusion part EP1 and a second protrusion part EP2 provided in a form symmetrical with respect to the reference line IML, thereby providing an improved display quality.

In the optical film OF in an embodiment described with reference to FIGS. 6 to 9, the upper surfaces US-1 and US-2 may be parallel to the bottom surfaces DS-1 and DS-2. However, the invention is not limited thereto, and the upper surfaces US-1 and US-2 may not be parallel to the bottom surfaces DS-1 and DS-2 and may be provided to define an inclination angle.

In an embodiment of the optical film OF, each of the protrusion part groups EPG includes a first protrusion part EP1 and a second protrusion part EP2 disposed adjacent to each other. In the cross section perpendicular to the base part BL, each of the first protrusion part EP1 and the second protrusion part EP2 may have an asymmetric quadrangle shape. In the cross section perpendicular to the base part BL, each of the first protrusion part EP1 and the second protrusion part EP2 may have a quadrangular shape in which at least one pair of opposite sides among the opposite sides facing each other is not parallel. In an embodiment of the optical film OF described with reference to FIGS. 6 to 9, in a cross section parallel to the plane defined by the first directional axis DR1 and the third directional axis DR3, the bottom surfaces DS-1 and DS-2 and the upper surfaces US-1 and US-2 are opposite sides facing in parallel with each other, and the first side surfaces SS-1a and SS-2a and the second side surfaces SS-1b and SS-2b correspond to opposite sides that are not parallel to each other, for example.

Hereinafter, an optical film and a first pattern layer included therein will be described with reference to FIGS. 10 to 15. In the description of an embodiment illustrated in FIGS. 10 to 15, the contents overlapping with those described in FIGS. 1 to 9 will not be described again, and the differences will be mainly described.

Figure 10:
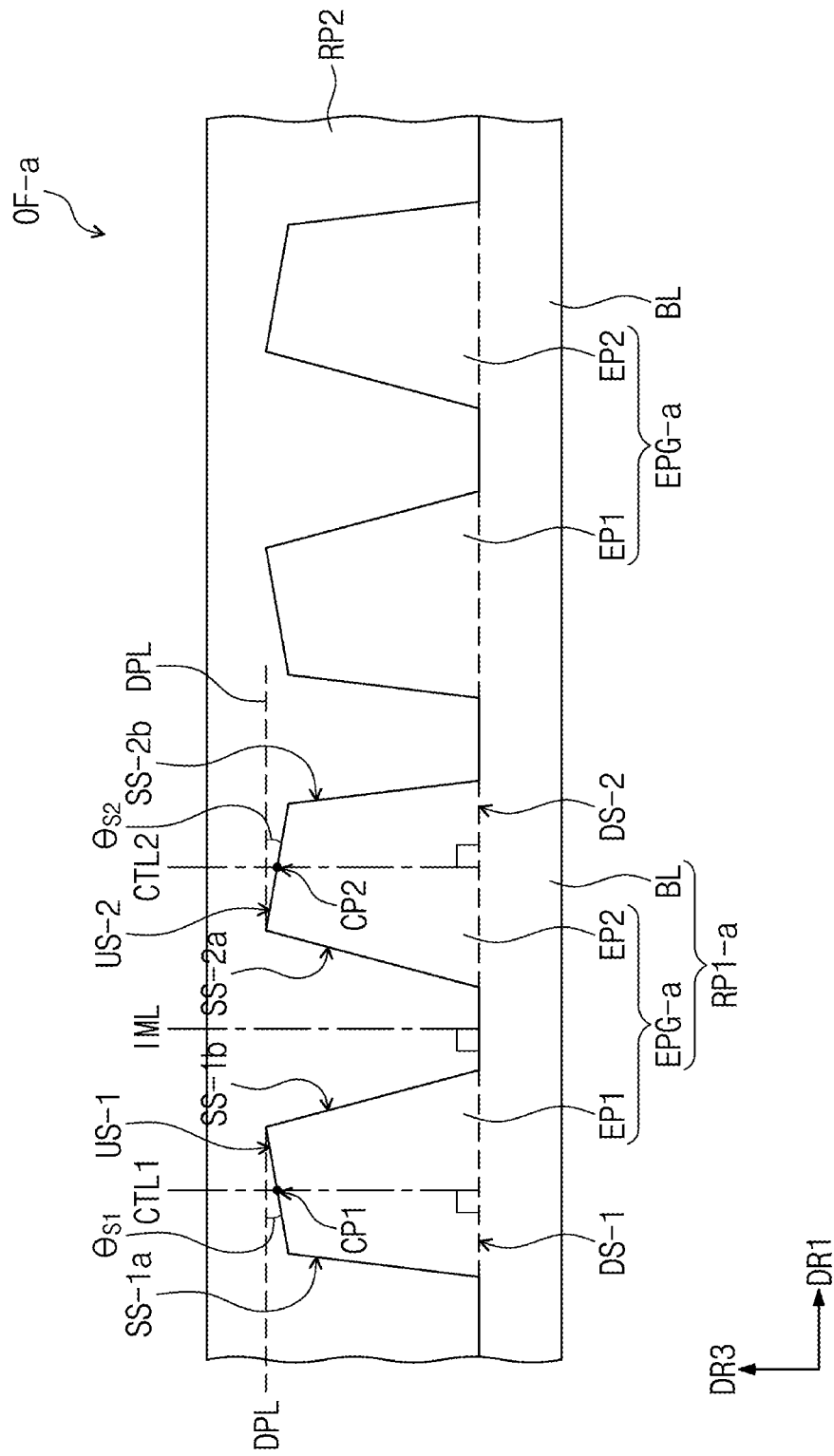
FIG. 10 is a cross-sectional view of an embodiment of a part of an optical film.
Figure 11:
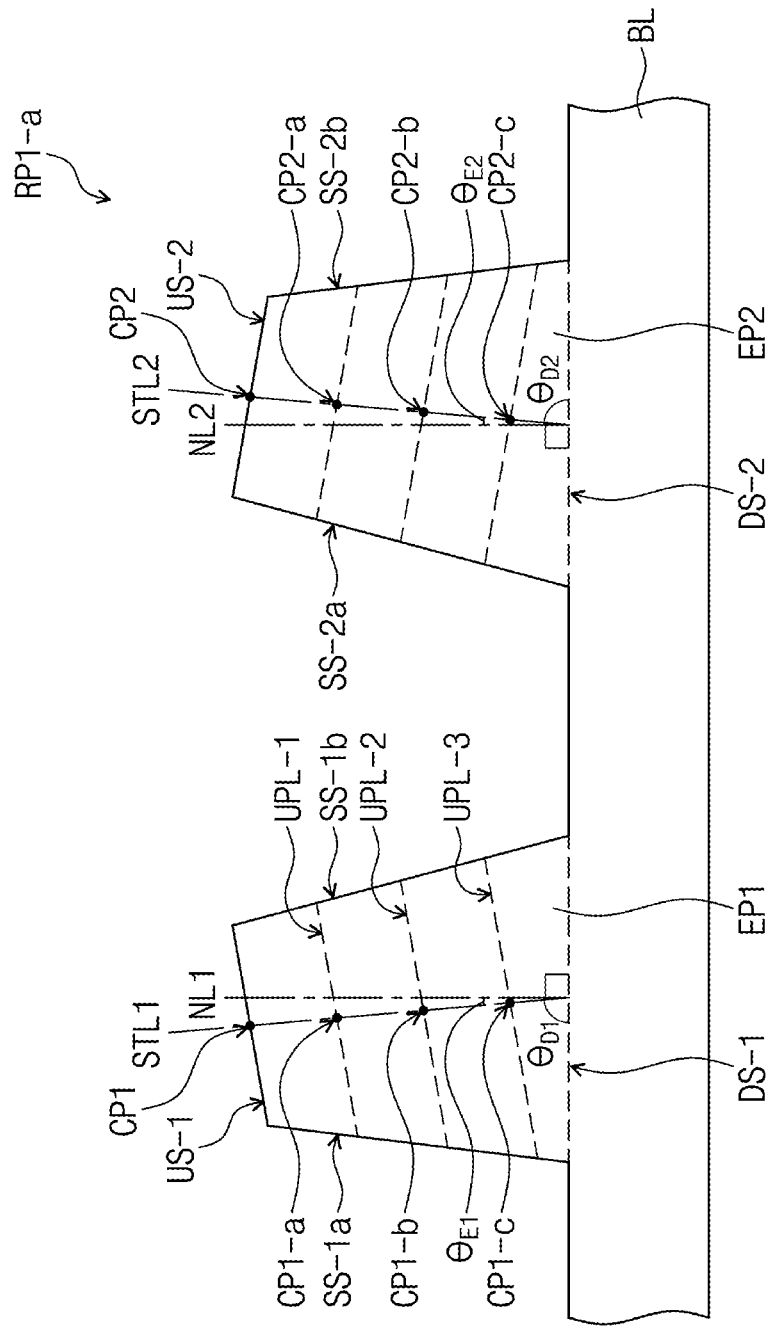
FIG. 11 is a cross-sectional view of an embodiment of a part of a pattern layer of an optical film.

FIG. 10 is a cross-sectional view showing an embodiment of an optical film OF-a. FIG. 11 is a cross-sectional view illustrating an example of the first pattern layer RP1-a included in the embodiment of the optical film OF-a illustrated in FIG. 10.

The optical film OF-a in an embodiment includes a first pattern layer RP1-a having a first refractive index value and a second pattern layer RP2 having a second refractive index value greater than the first refractive index. The first pattern layer RP1-a includes a plurality of protrusion part groups EPG-a, and each protrusion part group EPG-a includes a first protrusion part EP1 and a second protrusion part EP2 adjacent to each other.

In an embodiment of the optical film OF-a shown in FIGS. 10 and 11, compared with the optical film OF in the embodiment described with reference to FIGS. 6 to 9, there is a difference in that the bottom surfaces DS-1 and DS-2 of the first protrusion part EP1 and the second protrusion part EP2 are not parallel to the upper surfaces US-1 and US-2. The inclination angles $\theta_{S1}$ and $\theta_{S2}$ of the upper surfaces US-1 and US-2 with respect to the bottom surfaces DS-1 and DS-2 may be equal to or greater than about 2 degrees and equal to or less than about 10 degrees.

In an embodiment, the inclination angles $\theta_{S1}$ and $\theta_{S2}$ of the upper surfaces US-1 and US-2 with respect to the bottom surfaces DS-1 and DS-2 may be equal to or greater than about 2 degrees and equal to or less than about 5 degrees, for example.

The first protrusion part EP1 and the second protrusion part EP2 may be symmetrical with respect to the imaginary reference line IML passing through the center of the protrusion part group EPG-a. In addition, each of the first protrusion part EP1 and the second protrusion part EP2 may have a shape in which both side surfaces thereof are asymmetric with respect to the center lines CTL1 and CTL2.

In the cross section perpendicular to the base part BL, the first protrusion part EP1 may include a first upper surface US-1 inclined at a first inclination angle $\theta_{S1}$ with respect to an imaginary line DPL parallel to the first bottom surface DS-1. The first protrusion part EP1 may include a first sub side surface SS-1a and a second sub side surface SS-1b, which are asymmetric with respect to the first center line CTL1 passing through the center CP1 of the first upper surface US-1 and perpendicular to the first bottom surface DS-1.

In addition, at the first protrusion part EP1, the inclination angle $\theta_{D1}$ between the first symmetry line STL1 and the base part BL may be equal to or greater than about 80 degrees and equal to or less than about 88 degrees. The first symmetry line STL1 is an imaginary line connecting the center points CP1, CP1-a, CP1-b, and CP1-c, which are at the same distance from each of the first sub side surface SS-1a and the second sub side surface SS-1b of the first protrusion part EP1, and are on the imaginary lines UPL-1, UPL-2, and UPL-3 parallel to the first upper surface US-1. The included angle $\theta_{E1}$ defined by the first symmetry line STL1 with the first normal line NL1 perpendicular to the first bottom surface DS-1 may be equal to or greater than about 2 degrees and equal to or less than about 10 degrees.

Furthermore, in the cross section perpendicular to the base part BL, the second protrusion part EP2 may include a second upper surface US-2 inclined at a second inclination angle $\theta_{S2}$ with respect to an imaginary line DPL parallel to the second bottom surface DS-2. The first inclination angle $\theta_{S1}$ defined by the first upper surface US-1 in the first protrusion part EP1 and the second inclination angle $\theta_{S2}$ defined by the second upper surface US-2 in the second protrusion part EP2 may be the same. However, the first upper surface US-1 and the second upper surface US-2 may be inclined to be symmetrical with respect to the reference line IML.

It is shown in FIGS. 10 and 11 that the height of the first sub side surface SS-1a of the first protrusion part EP1 is lower than the height of the second sub side surface SS-1b and accordingly, the first upper surface US-1 is not parallel to the first bottom surface DS-1. In addition, it is shown that the second protrusion part EP2 is symmetrical with the first protrusion part EP1 based on the reference line IML, the height of the fourth sub side surface SS-2b is lower than the height of the third sub side surface SS-2a, and accordingly, the second upper surface US-2 is not parallel to the second bottom surface DS-2. However, the invention is not limited thereto, and the inclined directions of the first upper surface US-1 and the second upper surface US-2 may be opposite to those shown in the drawings.

The first protrusion part EP1 may include a first sub side surface SS-1$a$ and a second sub side surface SS-1$b$, which are asymmetric with respect to the first center line CTL1 passing through the center CP1 of the first upper surface US-1 and perpendicular to the first bottom surface DS-1. In addition, the inclination angle $\theta_{D1}$ between the first symmetry line STL1 and the base part BL may be equal to or greater than about 80 degrees and equal to or less than about 88 degrees. The first symmetry line STL1 is an imaginary line connecting the center points CP1, CP1-$a$, CP1-$b$, and CP1-$c$, which are at the same distance from each of the first sub side surface SS-1$a$ and the second sub side surface SS-1$b$, and are on the imaginary lines UPL-1, UPL-2, and UPL-3 parallel to the first upper surface US-1 in a cross section perpendicular to the base part BL. The included angle $\theta_{E1}$ defined by the first symmetry line STL1 with the first normal line NL1 perpendicular to the first bottom surface DS-1 may be equal to or greater than about 2 degrees and equal to or less than about 10 degrees.

In addition, the second protrusion part EP2 included in the one protrusion part group EPG-a together with the first protrusion part EP1 may include the third sub side surface SS-2$a$ and the fourth sub side surface SS-2$b$, which are asymmetrical with respect to the second center line CTL2 passing through the center CP2 of the second upper surface US-2 and perpendicular to the second bottom surface DS-2. In addition, the inclination angle $\theta_{D2}$ between the second symmetry line STL2 and the base part BL may be equal to or greater than about 80 degrees and equal to or less than about 88 degrees. The second symmetry line STL2 is an imaginary line connecting the center points CP2, CP2-$a$, CP2-$b$, and CP2-$c$, which are at the same distance from each of the third sub side surface SS-2$a$ and the fourth sub side surface SS-2$b$, and are on the imaginary lines UPL-1, UPL-2, and UPL-3 parallel to the second upper surface US-2 in a cross section perpendicular to the base part BL. The included angle $\theta_{E2}$ defined by the second symmetry line STL2 with the second normal line NL2 perpendicular to the second bottom surface DS-2 may be equal to or greater than about 2 degrees and equal to or less than about 10 degrees.

The optical film OF-a in the embodiment described with reference to FIGS. 10 and 11 may include a first protrusion part EP1 and a second protrusion part EP2 having a quadrangle shape in a cross section perpendicular to the base part BL. Each of the first protrusion part EP1 and the second protrusion part EP2 may have a quadrangle shape in which two pairs of opposite sides facing each other are not parallel to each other. In the cross section defined by the first directional axis DR1 and the third directional axis DR3, the bottom surfaces DS-1 and DS-2 and the upper surfaces US-1 and US-2 are opposite sides that are not parallel to each other, and the first side surfaces SS-1$a$ and SS-2$a$ and the second side surfaces SS-1$b$ and SS-2$b$ also correspond to opposite sides that are not parallel to each other.

In an embodiment of the optical films OF-b and OF-c shown in FIGS. 12 to 15, the side surfaces SS-1$a$, SS-1$b$, SS-2$a$, and SS-2$b$ of the protrusion parts EP1 and EP2 may be curved surfaces, respectively. The side surfaces SS-1$a$, SS-1$b$, SS-2$a$, and SS-2$b$ of the protrusion parts EP1 and EP2 may have a curved surface that is convex toward the second pattern layer RP2. In an embodiment, each of the first side surfaces SS-1$a$ and SS-2$a$ and the second side surfaces SS-1$b$ and SS-2$b$ may have a curved radius equal to or greater than about 40 micrometers ($\mu$m) and equal to or less than about 120 $\mu$m. Specifically, the radius of curvature of the first side surfaces SS-1$a$ and SS-2$a$ and the second side surfaces SS-1$b$ and SS-2$b$ of the protrusion parts EP1 and EP2 of the optical films OF-b and OF-c in an embodiment may be equal to or greater than about 40 $\mu$m and equal to or less than about 60 $\mu$m. Further, in an embodiment, the first side surfaces SS-1$a$ and SS-2$a$ and the second side surfaces SS-1$b$ and SS-2$b$ may be curved surfaces having the same radius of curvature.

Figure 12:
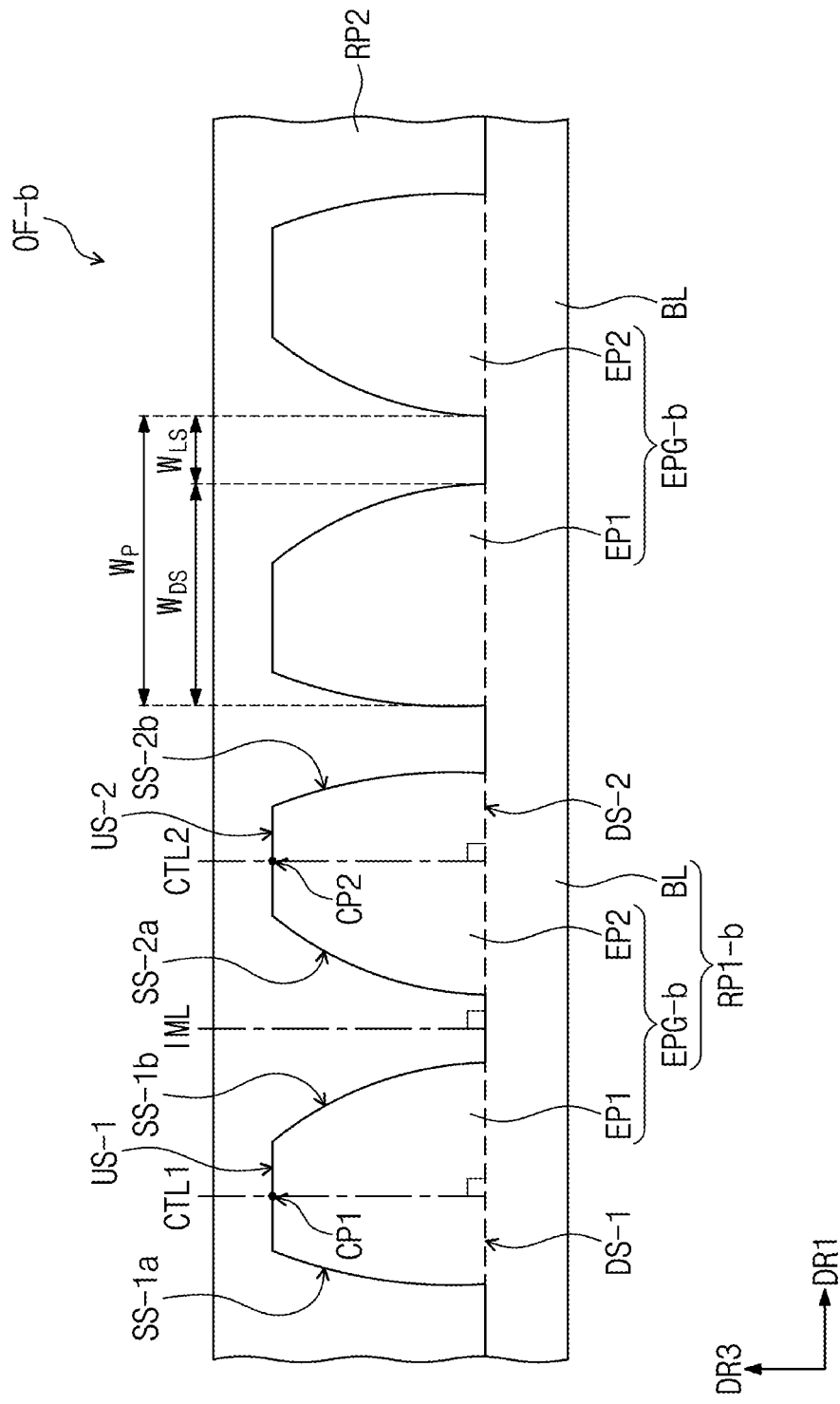
FIG. 12 is a cross-sectional view of an embodiment of a part of an optical film.
Figure 13:
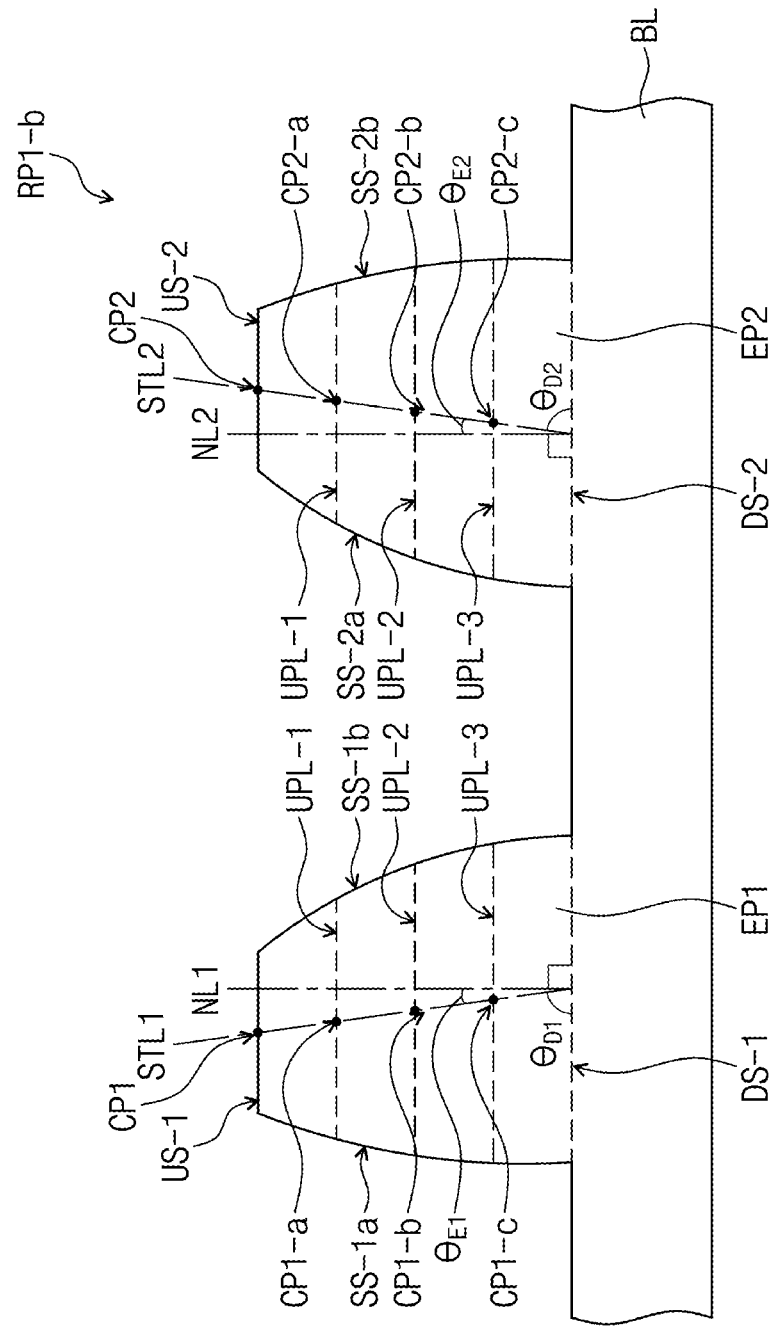
FIG. 13 is a cross-sectional view of an embodiment of a part of a pattern layer of an optical film.

Referring to FIGS. 12 to 13, the first pattern layer RP1-$b$ may include a plurality of protrusion part groups EPG-b, and each of the protrusion part groups EPG-b may include a first protrusion part EP1 and a second protrusion part EP2 which are symmetrical with respect to the reference line IML passing through the center of the protrusion group EPG-b. Each of the first protrusion part EP1 and the second protrusion part EP2 may have an asymmetrical shape with respect to the first center line CTL1 and the second center line CTL2.

In addition, each of the first symmetry line STL1 of the first protrusion part EP1 and the second symmetry line STL2 of the second protrusion part EP2 may have an inclination angle equal to or greater than about 80 degrees and equal to or less than about 88 degrees with respect to the first bottom surface DS-1 and the second bottom surface DS-2. The inclination angle $\theta_{D1}$ of the first symmetry line STL1 with respect to the first bottom surface DS-1 is an angle in a clockwise direction with respect to the first bottom surface DS-1. The inclination angle $\theta_{D2}$ of the second symmetry line STL2 with respect to the second bottom surface DS-2 is an angle in a counterclockwise direction with respect to the second bottom surface DS-2.

The first symmetry line STL1 is an imaginary line connecting the center points CP1, CP1-$a$, CP1-$b$, and CP1-$c$ on the imaginary lines UPL-1, UPL-2, and UPL-3 parallel to the first upper surface US-1 in the cross section perpendicular to the base part BL. In addition, the second symmetry line STL2 corresponds to an imaginary line connecting the center points CP2, CP2-$a$, CP2-$b$, and CP2-$c$ on the imaginary lines UPL-1, UPL-2, and UPL-3 parallel to the second upper surface US-2 in the cross section perpendicular to the base part BL.

The first normal line NL1 and the second normal line NL2 correspond to lines perpendicular to the first bottom surface DS-1 and the second bottom surface DS-2, respectively. In an embodiment, each of the included angle $\theta_{E1}$ defined by the first symmetry line STL1 with the first normal line NL1 and the included angle $\theta_{E2}$ defined by the second symmetry line STL2 with the second normal line NL2 may be equal to or greater than about 2 degrees and equal to or less than about 10 degrees.

The embodiment of the optical film OF-b shown in FIGS. 12 and 13 may include a first pattern layer RP1-$b$ in which the first protrusion part EP1 and the second protrusion part EP2 include including first side surfaces SS-1$a$ and SS-2$a$ and second side surfaces SS-1$b$ and SS-2$b$, respectively, which are asymmetric with respect to the center lines CTL1 and CTL2 and include curved surfaces convex toward the second pattern layer RP2. Bottom surfaces DS-1 and DS-2 and upper surfaces US-1 and US-2 of the first protrusion part EP1 and the second protrusion part EP2 included in the first pattern layer RP1-$b$ may be parallel.

Figure 14:
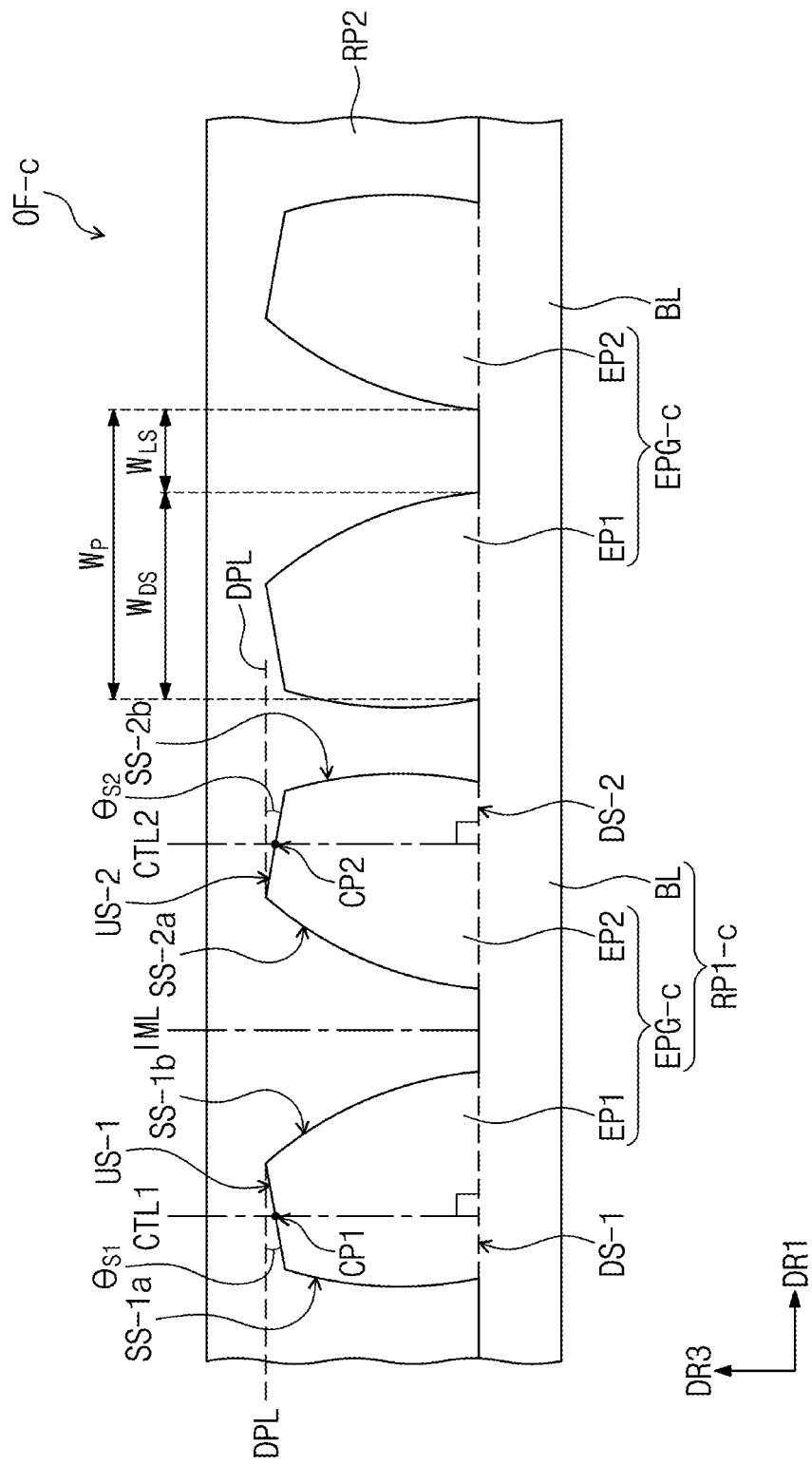
FIG. 14 is a cross-sectional view of an embodiment of a part of an optical film.
Figure 15:
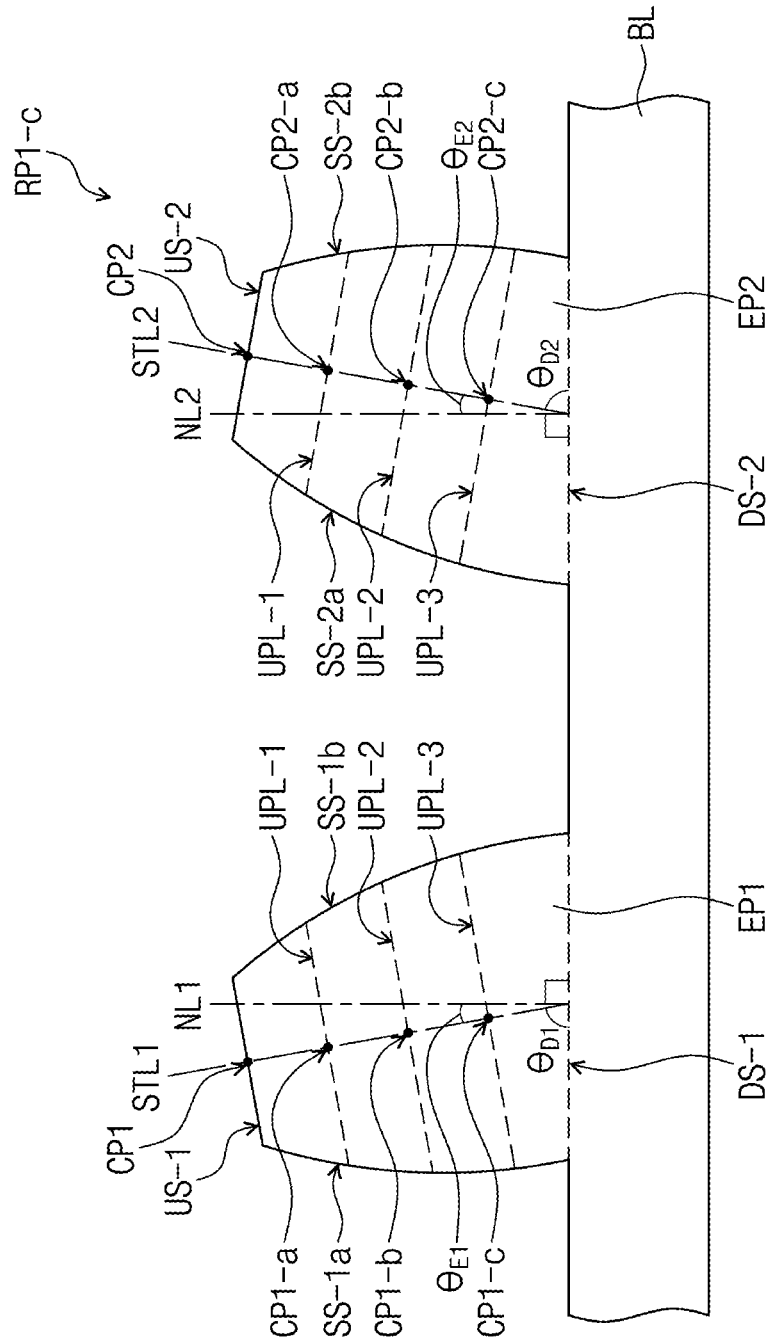
FIG. 15 is a cross-sectional view of an embodiment of a part of a pattern layer of an optical film.

In an embodiment of the optical film OF-c shown in FIGS. 14 and 15, compared with the embodiment of the optical film OF-b described with reference to FIGS. 12 to 13, there is a difference in that the bottom surfaces DS-1 and DS-2 of the first protrusion part EP1 and the second protrusion part EP2 are not parallel to the upper surfaces US-1 and US-2. The inclination angles $\theta_{S1}$ and $\theta_{S2}$ of the upper surfaces US-1 and US-2 with respect to the bottom surfaces DS-1 and DS-2 may be equal to or greater than about 2 degrees and equal to or less than about 10 degrees. In an embodiment, the inclination angles $\theta_{S1}$ and $\theta_{S2}$ of the upper surfaces US-1 and US-2 with respect to the bottom surfaces DS-1 and DS-2 may be equal to or greater than about 2 degrees and equal to or less than about 5 degrees, for example.

In the cross section perpendicular to the base part BL, the first protrusion part EP1 may include a first upper surface US-1 inclined at an inclination angle $\theta_{S1}$ with respect to an imaginary line DPL parallel to the first bottom surface DS-1. The first protrusion part EP1 may include a first sub side surface SS-1a and a second sub side surface SS-1b, which are asymmetric with respect to the first center line CTL1 passing through the center CP1 of the first upper surface US-1 and perpendicular to the first bottom surface DS-1. In addition, the inclination angle $\theta_{D1}$ between the first symmetry line STL1 and the base part BL may be equal to or greater than about 80 degrees and equal to or less than about 88 degrees. The first symmetry line STL1 is an imaginary line connecting the center points CP1, CP1-a, CP1-b, and CP1-c, which are at the same distance from each of the first sub side surface SS-1a and the second sub side surface SS-1b, and are on the imaginary lines UPL-1, UPL-2, and UPL-3 parallel to the first upper surface US-1 in a cross section perpendicular to the base part BL. The included angle $\theta_{E1}$ defined by the first symmetry line STL1 with the first normal line NL1 perpendicular to the first bottom surface DS-1 may be equal to or greater than about 2 degrees and equal to or less than about 10 degrees.

Furthermore, in the cross section perpendicular to the base part BL, the second protrusion part EP2 may include a second upper surface US-2 inclined at a second inclination angle $\theta_{S2}$ with respect to an imaginary line DPL parallel to the second bottom surface DS-2. The first inclination angle $\theta_{S1}$ defined by the first upper surface US-1 in the first protrusion part EP1 and the second inclination angle $\theta_{S2}$ defined by the second upper surface US-2 in the second protrusion part EP2 may be the same. In an embodiment, the first upper surface US-1 and the second upper surface US-2 may be inclined to be symmetrical with respect to the reference line IML. The inclined directions of the first upper surface US-1 and the second upper surface US-2 are not limited to those shown in FIGS. 14 and 15. The inclined directions of the first upper surface US-1 and the second upper surface US-2 may be opposite to those shown in FIGS. 14 and 15.

The second protrusion part EP2 included in the one protrusion part group EPG-c together with the first protrusion part EP1 may include the third sub side surface SS-2a and the fourth sub side surface SS-2b, which are asymmetrical with respect to the second center line CTL2 passing through the center CP2 of the second upper surface US-2 and perpendicular to the second bottom surface DS-2. In addition, the inclination angle $\theta_{D2}$ between the second symmetry line STL2 and the base part BL may be equal to or greater than about 80 degrees and equal to or less than about 88 degrees. The second symmetry line STL2 is an imaginary line connecting the center points CP2, CP2-a, CP2-b, and CP2-c, which are at the same distance from each of the third sub side surface SS-2a and the fourth sub side surface SS-2b, and are on the imaginary lines UPL-1, UPL-2, and UPL-3 parallel to the second upper surface US-2 in a cross section perpendicular to the base part BL. The included angle $\theta_{E1}$ defined by the second symmetry line STL2 with the second normal line NL2 perpendicular to the second bottom surface DS-2 may be equal to or greater than about 2 degrees and equal to or less than about 10 degrees.

The optical films OF-b and OF-c in the embodiment shown in FIGS. 12 to 15 may include the same configuration features as those of the optical films OF and OF-a described with reference to FIGS. 6 to 11 except that the side surface is a curved surface. That is, the separation pitch $W_P$ between the adjacent protrusion parts EP1 and EP2, the refractive index values of the first pattern layers RP1-b and RP1-c and the second pattern layer RP2, and the like may be the same as those described with reference to FIGS. 6 to 11.

The optical film in an embodiment, in which two protrusion parts included in the pattern layer have an asymmetric shape and adjacent two protrusion parts have a shape symmetrical to each other on the cross-section, may contribute to improving optical characteristics of the display device. In an embodiment, the optical film may contribute to the implementation of a display device having good luminance characteristics by improving a phenomenon that luminance varies unevenly in a viewing angle in the side surface direction, for example. That is, in an embodiment, the display device may include the optical film above the liquid crystal display panel to show improved viewing angle characteristics.

Figure 16:
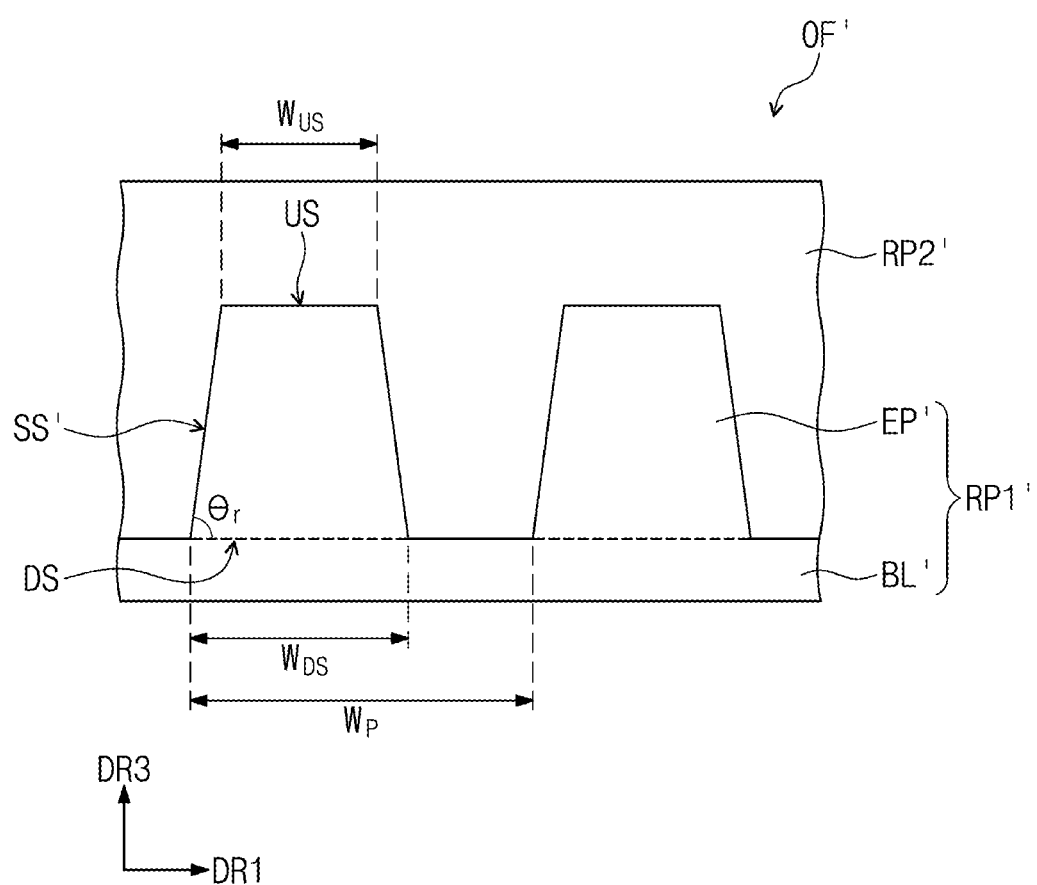
FIG. 16 is a cross-sectional view of a comparative example of a part of an optical film.

FIG. 16 is a cross-sectional view showing a part of an optical film used as a comparative example. The optical film OF' of the comparative example includes a first pattern layer RP1 including the protrusion part EP' having a trapezoidal shape in a cross section perpendicular to the base part BL' and a second pattern layer RP2' disposed on the first pattern layer RP1". In a comparative example of the optical film OF', there is a difference in the shape of the side surface SS' as compared with an embodiment of the optical films. In the optical film OF' of the comparative example, the side surface SS' of the protrusion part EP' corresponds to a linear shape in which both side surfaces have the same inclination angle $\theta_r$ with respect to the bottom surface DS. That is, the optical film OF' used as a comparative example corresponds to the protrusion part EP' having one symmetrical shape. The protrusion part EP' may further include an upper surface US having a width $W_{US}$.

In the optical film OF' used in the comparative example in the viewing angle characteristic evaluation results of the comparative examples and the embodiment described with reference to FIGS. 17A and 17B, the separation pitch $W_P$ between the adjacent protrusion parts EP' and the width $W_{DS}$ of the bottom surface DS were used under the same conditions as those of the optical films used in the embodiment. In the comparative example, the inclination angle $\theta_r$ of the side surface SS' was used as being 87.1 degrees. In the optical films used in the comparative example and the embodiment, the separation pitch $W_P$ between the protrusion parts EP' was 27.5 μm, and the width $W_{DS}$ of the bottom surface was 16 m.

Figure 17A:
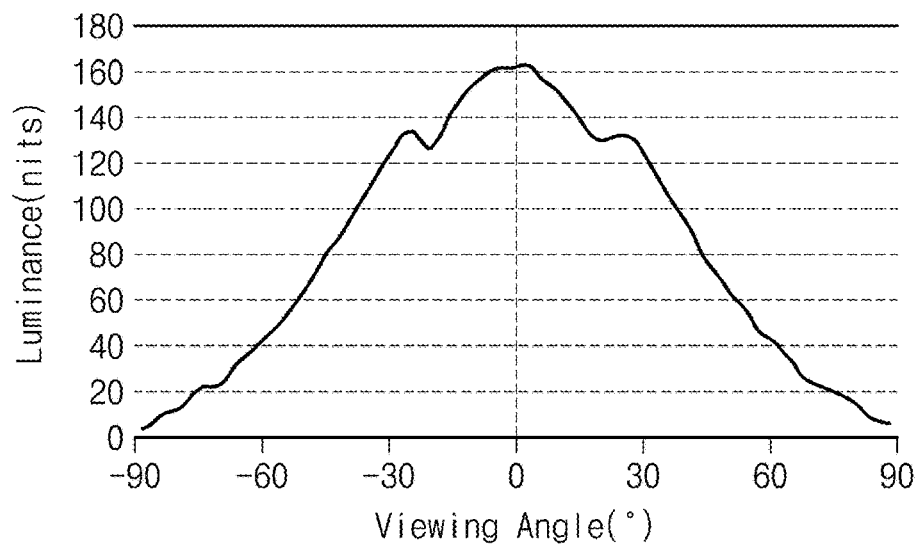
FIG. 17A is a graph showing a viewing angle characteristic evaluation result in the comparative example of the display device using the optical film of FIG. 16.
Figure 17B:
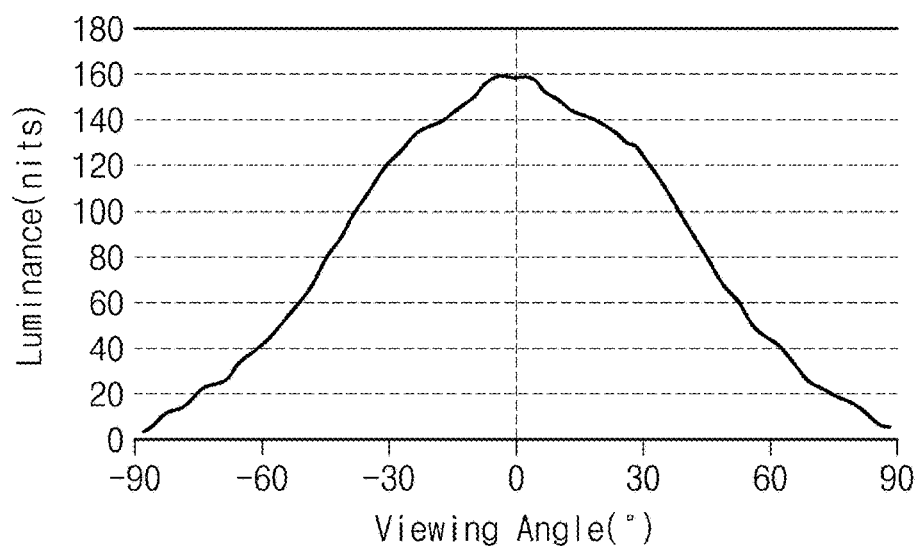
FIG. 17B is a graph showing the evaluation results of viewing angle characteristics in an embodiment of a display device according to the invention.

FIGS. 17A and 17B show results of evaluating viewing angle characteristics of a comparative example of a display device and an embodiment of a display device including an optical film of the invention.

FIG. 17A illustrates luminance characteristics according to viewing angles of the comparative example of a display device including the optical film illustrated in FIG. 16. FIG. 17B illustrates a result of evaluating luminance characteristics of the embodiment of the display device including the optical film described with reference to FIGS. 10 to 11. In the optical film used for an embodiment evaluation, the inclination angle between a symmetry line and a normal line was 3 degrees. Except that the configuration of the optical film was changed in the comparative example and embodiment, the remaining configuration of the display device was manufactured in the same manner.

Referring to FIGS. 17A and 17B, it may be seen that the luminance non-uniformity problem in the side surface viewing angle is improved in the embodiment compared with the comparative example. That is, it may be seen that the luminance variation in the viewing angle direction of 30 degrees from the left and right based on the front direction with the angle of 0 degree is large in the comparative example, and the luminance variation in the viewing angle direction of about 30 degrees is decreased to increase the luminance uniformity in the embodiment.

That is, when the display device includes the configuration of the optical film in an embodiment, it may be seen that the side surface display quality is further improved compared to the comparative example.

As the optical film in an embodiment includes a protrusion part having a shape in which both side surfaces are asymmetrical and a pattern layer having a shape in which two adjacent and different protrusion parts are symmetrical with respect to the reference line, the direction in which light incident into the optical film is dispersed is widened and the concentration of light emitted from a predetermined angle is improved. Therefore, it may be used to improve side surface viewing angle characteristics of a display device.

FIGS. 18A to 18D are cross-sectional views illustrating an embodiment of a part of the display device. FIGS. 18A to 18D illustrate another embodiment of a portion corresponding to area "AA" of FIG. 3.

Compared to the display device in the embodiment illustrated in FIG. 5, FIGS. 18A to 18D show a difference in the configuration of the optical member OU and the upper polarizing layer POL-T. In the description of an embodiment illustrated in FIGS. 18A to 18D, the contents overlapping with those described in FIGS. 1 to 15 will not be described again, and the differences will be mainly described. FIGS. 18A to 18D illustrate an embodiment in which the embodiment of the optical film OF described with reference to FIGS. 6 to 9 is included, but the invention is not limited thereto. The optical film OF in FIGS. 18A to 18D will be described with reference to FIGS. 10 to 15 and any form of optical film in the range without departing from the scope of the invention may be applied without limitation.

Figure 18A:
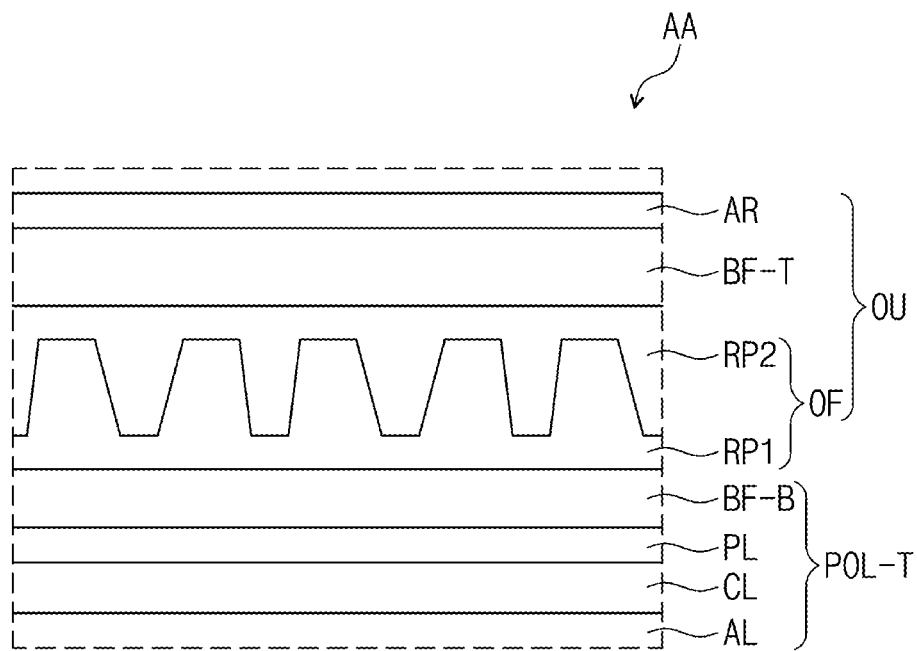
FIGS. 18A to 18D are cross-sectional views showing an embodiment of a part of a display device.

In the embodiment shown in FIG. 18A, compared to the embodiment shown in FIG. 5, the adhesive layer AD disposed between the upper polarizing layer POL-T and the optical film OF may be omitted. The adhesive layer AD may be omitted and the optical film OF may be disposed directly on the upper polarizing layer POL-T.

Figure 18B:
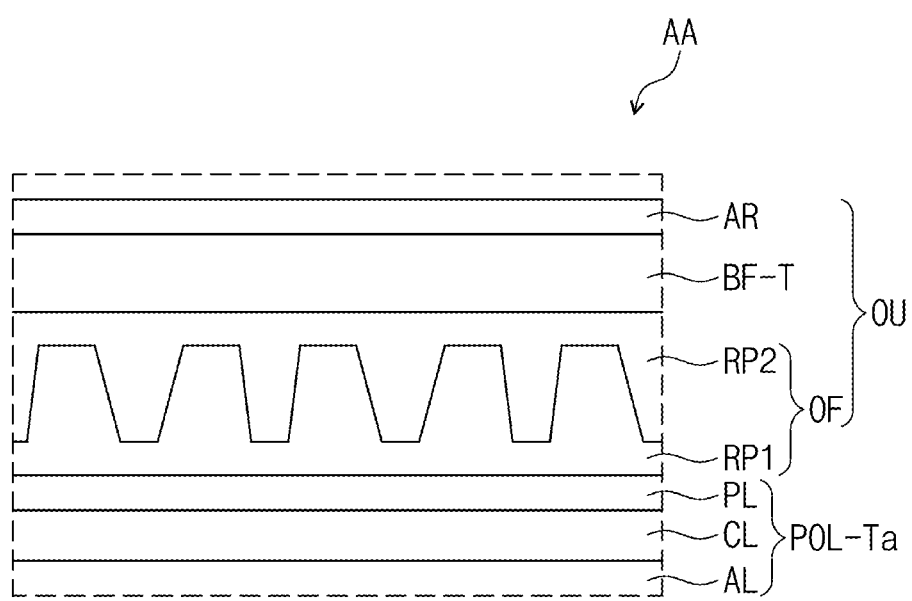

In the embodiment shown in FIG. 18B, compared to the embodiment shown in FIG. 5, the adhesive layer AD disposed between the upper polarizing layer POL-Ta and the optical film OF and the base layer BF-B included in the upper polarizing layer POL-T may be omitted. In an embodiment, the optical film OF may be disposed directly on the polarizer PL.

In FIGS. 18A and 18B, the first pattern layer RP1 may be directly disposed on the upper polarizing layers POL-T and POL-Ta. In this case, the first pattern layer RP1 may serve as a coupling member for coupling the upper polarizing layer POL-T and the optical member OU of the adjacent liquid crystal display panel DP. In an embodiment, the first pattern layer RP1 may be an adhesive layer, and specifically, the first pattern layer RP1 may be an optical clear adhesive layer, for example.

Figure 18C:
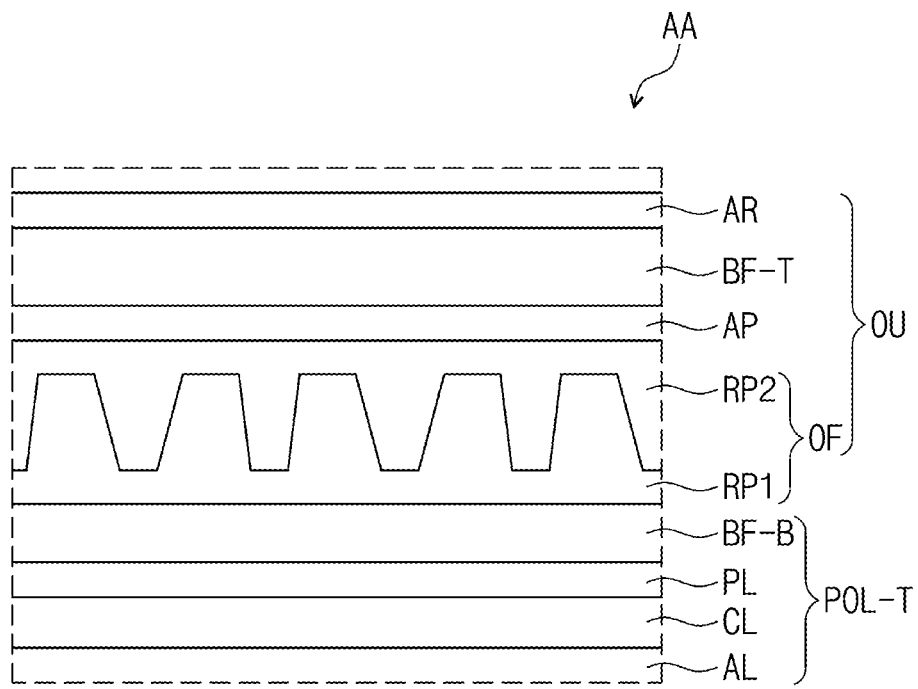

In the embodiment shown in FIG. 18C, compared to the embodiment shown in FIG. 5, there is a difference that the adhesive layer AD disposed between the upper polarizing layer POL-T and the optical film OF is omitted, and an organic layer AP between the optical film OF and the base film BF-T is further included. The organic layer AP may be provided between the second pattern layer RP2 and the base film BF-T and may be a primer layer used to increase the adhesion of the optical film OF to the base film BF-T. The refractive index value of the organic layer AP is not limited and may be the same as that of the first pattern layer RP1 or the same as that of the second pattern layer RP2. However, the invention is not limited thereto.

Figure 18D:
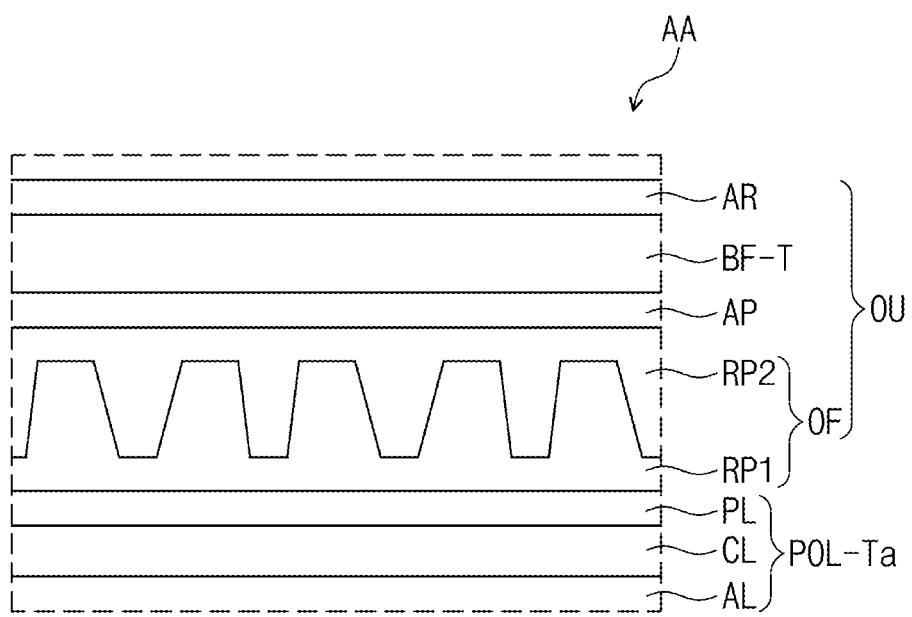

In the embodiment shown in FIG. 18D, compared to the embodiment shown in FIG. 5, there is a difference that the adhesive layer AD disposed between the upper polarizing layer POL-Ta and the optical film OF and the base layer BF-B included in the upper polarizing layer POL-Ta are omitted, and an organic layer AP between the optical film OF and the base film BF-T is further included. As described above, the organic layer AP may be a primer layer used to increase the bonding force between the optical film OF and the base film BF-T.

In the embodiments of FIGS. 18C and 18D, the first pattern layer RP1 may be an adhesive layer that serves as a coupling member for coupling the upper polarizing layers POL-T and POL-Ta and the optical member OU of the adjacent liquid crystal display panel DP. The first pattern layer RP1 may be disposed directly on the base layer BF-B or directly on the polarizer PL.

The display device in an embodiment includes an optical film disposed on a liquid crystal display panel and including two pattern layers having different refractive indices, thereby showing improved viewing angle characteristics and luminance characteristics.

An optical film in an embodiment includes a plurality of protrusion part groups in the optical pattern layer, and each of the protrusion part groups includes a first protrusion part and a second protrusion part having an asymmetric shape. Accordingly, the light scattering effect in the protrusion part group may be increased, so that the display device in an embodiment may have improved display quality. In addition, the optical film in an embodiment includes a protrusion part group in which each of the protrusion parts optimizes an inclination angle with respect to the base part and an arrangement shape of adjacent first protrusion parts and second protrusion parts so that the display device in an embodiment may have improved display quality.

An embodiment may provide an optical film that may include a pattern layer having an optimized shape of a protrusion part to improve display quality of a display device.

In an embodiment, there is provided a display device having improved display quality in a side surface viewing angle direction by including an optical film that optimizes the shape of each of the protrusion parts in the pattern layer and the arrangement between two adjacent protrusion parts.

Although the embodiments of the invention have been described, it is understood that the invention should not be limited to these embodiments but various changes and modifications may be made by one ordinary skilled in the art.

What is claimed is:
1. An optical film comprising:
   a first pattern layer including a base part and a plurality of
      protrusion part groups disposed on the base part and having a first refractive index, each of the plurality of protrusion part groups comprising:
- a first protrusion part and a second protrusion part disposed adjacent to each other, each of the first protrusion part and the second protrusion part comprising:
  - a bottom surface adjacent the base part;
  - an upper surface facing the bottom surface;
  - a first side surface connecting between the bottom surface and the upper surface; and
  - a second side surface connecting between the bottom surface and the upper surface and facing the first side surface; and
- a second pattern layer disposed on the first pattern layer and having a second refractive index greater than the first refractive index,
- wherein the first protrusion part and the second protrusion part are symmetrical with respect to a reference line passing through a center of each of the protrusion part groups and perpendicular to the base part,
- wherein the first protrusion part and the second protrusion part are asymmetrical with respect to a center line passing through a center of the upper surface and perpendicular to the bottom surface.

2. The optical film of claim 1, wherein in a cross section perpendicular to the base part, a symmetry line connecting center points, which are disposed on imaginary lines parallel to the upper surface and disposed at a same distance from each of the first side surface and the second side surface, has an inclination angle equal to or greater than about 80 degrees and equal to or less than about 88 degrees with respect to the base part.

3. The optical film of claim 2, wherein an included angle between a normal line perpendicular to the bottom surface and the symmetry line is equal to or greater than about 2 degrees and equal to or less than about 10 degrees.

4. The optical film of claim 1, wherein the upper surface is parallel to the bottom surface.

5. The optical film of claim 1, wherein an inclination angle of the upper surface with respect to the bottom surface is equal to or greater than about 2 degrees and equal to or less than about 10 degrees.

6. The optical film of claim 1, wherein in a cross section perpendicular to the base part, each of the first protrusion part and the second protrusion part has a quadrangle shape in which at least one of a pair of the bottom and upper surfaces and a pair of the first and second side surfaces is not parallel.

7. The optical film of claim 1, wherein the first protrusion part comprises:
- a first bottom surface adjacent the base part;
- a first upper surface facing the first bottom surface;
- a first sub side surface connecting between the first bottom surface and the first upper surface and having a first inclination angle with respect to the first bottom surface; and
- a second sub side surface connecting between the first bottom surface and the first upper surface and having a second inclination angle different from the first inclination angle with respect to the first bottom surface, wherein the second protrusion part comprises:
- a second bottom surface adjacent the base part;
- a second upper surface facing the second bottom surface;
- a third sub side surface connecting between the second bottom surface and the second upper surface and having a third inclination angle with respect to the second bottom surface; and
- a fourth sub side surface connecting between the second bottom surface and the second upper surface and having a fourth inclination angle different from the third inclination angle with respect to the second bottom surface, wherein the first inclination angle and the fourth inclination angle are equal to each other, and the second inclination angle and the third inclination angle are equal to each other, wherein the first inclination angle to the fourth inclination angle are acute angles defined by each of the first sub side surface and the fourth sub side surface with the base part.

8. The optical film of claim 1, wherein the first protrusion part comprises:
- a first bottom surface adjacent the base part;
- a first upper surface facing the first bottom surface;
- a first sub side surface connecting between the first bottom surface and the first upper surface; and
- a second sub side surface connecting between the first bottom surface and the first upper surface and facing the first sub side surface, wherein the second protrusion part comprises:
- a second bottom surface adjacent the base part;
- a second upper surface facing the second bottom surface;
- a third sub side surface connecting between the second bottom surface and the second upper surface; and
- a fourth sub side surface connecting between the second bottom surface and the second upper surface and facing the third sub side surface, wherein in a cross section perpendicular to the base part, a first symmetry line has an inclination angle equal to or greater than about 80 degrees and equal to or less than about 88 degrees in a clockwise direction with respect to the first bottom surface, the first symmetry line connecting center points disposed on imaginary lines parallel to the first upper surface and disposed at a same distance from each of the first sub side surface and the second sub side surface, wherein a second symmetry line has an inclination angle equal to or greater than about 80 degrees and equal to or less than about 88 degrees in a counterclockwise direction with respect to the second bottom surface, the second symmetry line connecting center points disposed on imaginary lines parallel to the second upper surface and disposed at a same distance from each of the third sub side surface and the fourth sub side surface.

9. The optical film of claim 1, wherein each of the first side surface and the second side surface is a curved surface convex toward the second pattern layer.

10. The optical film of claim 9, wherein a radius of curvature of each of the first side surface and the second side surface is equal to or greater than 40 micrometers and equal to or less than 120 micrometers.

11. The optical film of claim 10, wherein the radius of curvature of the first side surface and the radius of curvature of the second side surface are equal to each other.

12. The optical film of claim 1, wherein a difference between the first refractive index and the second refractive index is equal to or greater than 0.1.

13. The optical film of claim 1, wherein the plurality of protrusion part groups extends in a first direction and is spaced apart from each other in a second direction perpendicular to the first direction.

14. An optical film comprising:
a first pattern layer including a base part and a first protrusion part and a second protrusion part disposed on the base part and having a first refractive index, the first protrusion part comprising:
a first bottom surface adjacent the base part;
a first upper surface facing the first bottom surface;
a first sub side surface connecting between the first bottom surface and the first upper surface; and
a second sub side surface connecting between the first bottom surface and the first upper surface and facing the first sub side surface;
the second protrusion part comprising:
a second bottom surface adjacent the base part;
a second upper surface facing the second bottom surface;
a third sub side surface connecting between the second bottom surface and the second upper surface; and
a fourth sub side surface connecting between the second bottom surface and the second upper surface and facing the third sub side surface; and
a second pattern layer disposed on the first pattern layer and having a second refractive index greater than the first refractive index,
wherein in a cross section perpendicular to the base part, a first symmetry line has an inclination angle equal to or greater than about 80 degrees and equal to or less than about 88 degrees in a clockwise direction with respect to the first bottom surface, the first symmetry line connecting center points disposed on imaginary lines parallel to the first upper surface and disposed at a same distance from each of the first sub side surface and the second sub side surface,
wherein a second symmetry line has an inclination angle equal to or greater than about 80 degrees and equal to or less than about 88 degrees in a counterclockwise direction with respect to the second bottom surface, the second symmetry line connecting center points disposed on imaginary lines parallel to the second upper surface and disposed at a same distance from each of the third sub side surface and the fourth sub side surface the first protrusion part and the second protrusion part are symmetrical with respect to a reference line passing through a center of the first and second protrusion parts and perpendicular to the base part, and the first protrusion part and the second protrusion part are asymmetrical with respect to center lines respectively passing through centers of the first and second upper surfaces and perpendicular to the bottom surface.

15. The optical film of claim 14, wherein the first protrusion part and the second protrusion part extend in a first direction and are alternately and repeatedly arranged in a second direction perpendicular to the first direction.

16. The optical film of claim 15, wherein the first symmetry line of and the symmetry second line are symmetric with respect to a reference line which passes through a center between the neighboring first and second protrusion parts and is perpendicular to the base part.

17. The optical film of claim 14, wherein each of a first included angle defined by a first normal line perpendicular to the first bottom surface with the first symmetry line and a second included angle defined by a second normal line perpendicular to the second bottom surface with the second symmetric line is equal to or greater than about 2 degrees and equal to or less than about 10 degrees.

18. The optical film of claim 14, wherein each of a first inclination angle of the first upper surface with respect to the first bottom surface and a second inclination angle of the second upper surface with respect to the second bottom surface is equal to or greater than about 2 degrees and equal to or less than about 10 degrees.

19. The optical film of claim 14, wherein each of the first sub side surface to the fourth sub side surface is a curved surface convex toward the second pattern layer.

20. A display device comprising:
a liquid crystal display panel including a plurality of pixel areas; and
an optical member disposed on the liquid crystal display panel and including an optical film, the optical film comprising:
a first pattern layer including a base part and a plurality of protrusion part groups disposed on the base part and having a first refractive index, each of the plurality of protrusion part groups comprising:
a first protrusion part and a second protrusion part disposed adjacent to each other; each of the first protrusion part and the second protrusion part comprising:
a bottom surface adjacent the base part;
an upper surface facing the bottom surface;
a first side surface connecting between the bottom surface and the upper surface; and
a second side surface connecting between the bottom surface and the upper surface and facing the first side surface; and
a second pattern layer disposed on the first pattern layer and having a second refractive index greater than the first refractive index,
wherein the first protrusion part and the second protrusion part are symmetrical with respect to a reference line passing through a center of each of the protrusion part groups and perpendicular to the base part,
wherein the first protrusion part and the second protrusion part are asymmetrical with respect to a center line passing through a center of the upper surface and perpendicular to the bottom surface.

21. The display device of claim 20, wherein each of the plurality of pixel areas overlaps both the first protrusion part and the second protrusion part.

22. The display device of claim 20, wherein each of the plurality of pixel areas overlaps one or two of the plurality of protrusion part groups.

23. The display device of claim 20, wherein the liquid crystal display panel comprises:
a liquid crystal layer;
a lower polarizing layer disposed below the liquid crystal layer; and
an upper polarizing layer disposed between the liquid crystal layer and the optical film.

24. The display device of claim 23, wherein the optical film is disposed directly on the upper polarizing layer,
wherein the first pattern layer is an adhesive layer.

25. The display device of claim 23, wherein the upper polarizing layer comprises a polarizer layer,
wherein the first pattern layer is directly disposed on the polarizer layer.

26. The display device of claim 20, wherein the optical member further includes:
a base film disposed on the second pattern layer; and
an organic layer disposed between the base film and the second pattern layer,
wherein the organic layer is a primer layer.

27. The display device of claim 20, wherein in a cross section perpendicular to the base part, a symmetry line connecting center points, which are disposed on imaginary lines parallel to the upper surface and disposed at a same distance from each of the first side surface and the second side surface, has an inclination angle equal to or greater than about 80 degrees and equal to or less than about 88 degrees with respect to the base part.

28. The display device of claim 20, wherein the upper surface is parallel to the bottom surface.

29. The display device of claim 20, wherein an inclination angle of the upper surface with respect to the bottom surface is equal to or greater than about 2 degrees and equal to or less than about 10 degrees.

30. The display device of claim 20, wherein each of the first side surface and the second side surface is a curved surface convex toward the second pattern layer.

\* \* \* \* \*